US011752939B2

(12) United States Patent
Hayashi et al.

(10) Patent No.: US 11,752,939 B2
(45) Date of Patent: Sep. 12, 2023

(54) INFORMATION PRESENTATION DEVICE, INFORMATION PRESENTATION METHOD AND PROGRAM PRODUCT FOR PRESENTING INFORMATION

(71) Applicant: DENSO CORPORATION, Kariya (JP)

(72) Inventors: Akihiro Hayashi, Kariya (JP); Kunihiko Chiba, Kariya (JP); Takeshi Hatoh, Kariya (JP); Yasushi Sakuma, Kariya (JP); Iichirou Terao, Kariya (JP)

(73) Assignee: DENSO CORPORATION, Kariya (JP)

( * ) Notice: Subject to any disclaimer, the term of this patent is extended or adjusted under 35 U.S.C. 154(b) by 14 days.

(21) Appl. No.: 17/535,086

(22) Filed: Nov. 24, 2021

(65) Prior Publication Data

US 2022/0080888 A1 Mar. 17, 2022

Related U.S. Application Data

(63) Continuation of application No. PCT/JP2020/019127, filed on May 13, 2020.

(30) Foreign Application Priority Data

May 30, 2019 (JP) ................................ 2019-101357

(51) Int. Cl.
*B60Q 9/00* (2006.01)
*G06V 20/59* (2022.01)
(Continued)

(52) U.S. Cl.
CPC .......... *B60Q 9/008* (2013.01); *G06V 20/597* (2022.01); *G08G 1/16* (2013.01); *G01S 13/931* (2013.01)

(58) Field of Classification Search
CPC ........ B60Q 9/008; G06V 20/597; G08G 1/16; G01S 13/931
See application file for complete search history.

(56) References Cited

U.S. PATENT DOCUMENTS

2011/0128139 A1* 6/2011 Tauchi ............... G01C 21/3697
340/439
2017/0300762 A1* 10/2017 Ishii .................... G06F 3/04883
(Continued)

FOREIGN PATENT DOCUMENTS

JP     H07-061257 A    3/1995
JP     2010-126135 A   6/2010
(Continued)

*Primary Examiner* — Mohamed Barakat
(74) *Attorney, Agent, or Firm* — Harness, Dickey & Pierce, P.L.C.

(57) ABSTRACT

An information presentation apparatus includes an out-of-vehicle risk detection section that is configured to detect an out-of-vehicle risk object, a gaze detection section that is configured to detect a gaze direction of a driver of the vehicle, a recognition determination section that is configured to determine whether the out-of-vehicle risk object is recognized by the driver based on a detection result by the out-of-vehicle risk detection section and a detection result by the gaze detection section, and an information presentation section that is configured to present, to the driver, out-of-vehicle risk information regarding the out-of-vehicle risk object in a presentation mode. The information presentation section is further configured to change the presentation mode depending on whether the out-of-vehicle risk object is recognized by the driver based on a determination result by the recognition determination section.

9 Claims, 19 Drawing Sheets

(51) Int. Cl.
    *G08G 1/16*        (2006.01)
    *G01S 13/931*    (2020.01)

(56)           References Cited

U.S. PATENT DOCUMENTS

| | | |
|---|---|---|
| 2018/0086346 A1 | 3/2018 | Fujisawa et al. |
| 2018/0118109 A1 | 5/2018 | Fujisawa et al. |
| 2020/0139992 A1* | 5/2020 | Oba ................... G08G 1/16 |
| 2020/0254876 A1* | 8/2020 | Cordell ............... G06V 20/56 |

FOREIGN PATENT DOCUMENTS

| | | |
|---|---|---|
| JP | 2015-026185 A | 2/2015 |
| JP | 2016-197407 A | 11/2016 |
| JP | 2017-097687 A | 6/2017 |
| JP | 2018-173716 A | 11/2018 |
| WO | WO-2016-067545 A1 | 5/2016 |

* cited by examiner

FIG. 7

| | | REF. DEVICE | AUXILIARY DEVICE / GAZE DIRECTION OF DRIVER | | | | | | | | | |
|---|---|---|---|---|---|---|---|---|---|---|---|---|
| | | | FORWARD | | | FRONT SIDEWARD | | SIDEWARD | | REAR SIDEWARD | | REARWARD |
| RISK DIRECTION | | | FRONT | RIGHT | LEFT | RIGHT | LEFT | RIGHT | LEFT | RIGHT | LEFT | FRONT |
| FORWARD | FRONT | 5 | none (C1) | +14/15 +11 | +14/15 +11 | +14/15 +11 | +14/15 +11 | +14/15 +12 | +14/15 +13 | +14/15 +12 | +14/15 +13 | +14/15 +5 |
| FORWARD | RIGHT | 11 | +14/15 +5 | none | +14/15 +11 | +14/15 +11 | +14/15 +11 | +14/15 +12 | +14/15 +13 | +14/15 +12 | +14/15 +13 | +14/15 +5 |
| FORWARD | LEFT | 11 | +14/15 +5 | +14/15 +11 | none | +14/15 +11 | +14/15 +11 | +14/15 +12 | +14/15 +13 | +14/15 +12 | +14/15 +13 | +14/15 +5 |
| FRONT SIDEWARD | RIGHT | 11 | +14/15 +5 | +14/15 +11 | +14/15 +11 | none | +14/15 +11 (C2) | +14/15 +12 | +14/15 +13 | +14/15 +12 | +14/15 +13 | +14/15 +5 |
| FRONT SIDEWARD | LEFT | 11 | +14/15 +5 | +14/15 +11 | +14/15 +11 | +14/15 +11 | none | +14/15 +12 | +14/15 +13 | +14/15 +12 | +14/15 +13 | +14/15 +5 |
| SIDEWARD | RIGHT | 12 | +14/15 +5 | +14/15 +11 | +14/15 +11 | +14/15 +11 | +14/15 +11 | none | +14/15 +13 | +14/15 +12 | +14/15 +13 | +14/15 +5 |
| SIDEWARD | LEFT | 13 | +14/15 +5 | +14/15 +11 | +14/15 +11 | +14/15 +11 | +14/15 +11 | +14/15 +12 | none | +14/15 +12 (C3) | +14/15 +13 (C4) | +14/15 +5 |
| REAR SIDEWARD | RIGHT | 8 | +14/15 +5 | +14/15 +11 | +14/15 +11 | +14/15 +11 | +14/15 +11 | +14/15 +12 | +14/15 +13 | none | +14/15 +13 | +14/15 +5 |
| REAR SIDEWARD | LEFT | 9 | +14/15 +5 | +14/15 +11 | +14/15 +11 | +14/15 +11 | +14/15 +11 | +14/15 +12 | +14/15 +13 | +14/15 +12 | none | +14/15 +5 |
| REARWARD | FRONT | 10 | +14/15 +5 | +14/15 +11 | +14/15 +11 | +14/15 +11 | +14/15 +11 | +14/15 +12 | +14/15 +13 | +14/15 +12 | +14/15 +13 | none |

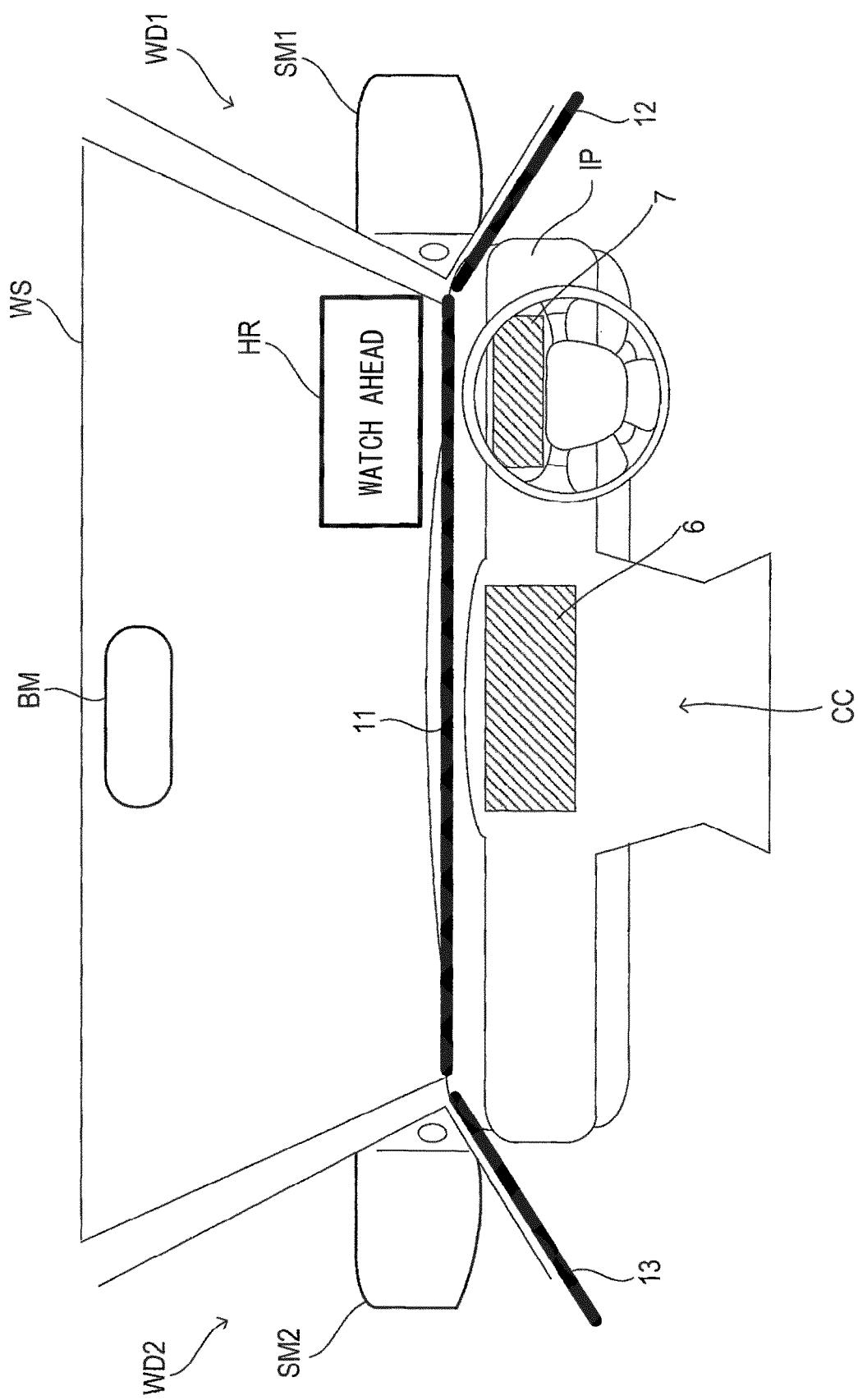

INFORMATION PRESENTATION DEVICE, INFORMATION PRESENTATION METHOD AND PROGRAM PRODUCT FOR PRESENTING INFORMATION

CROSS REFERENCE TO RELATED APPLICATIONS

This application is a continuation application of International Patent Application No. PCT/JP2020/019127 filed on May 13, 2020, which designated the U.S. and claims the benefit of priority from Japanese Patent Application No. 2019-101357 filed on May 30, 2019. The entire disclosure of all of the above application is incorporated herein by reference.

TECHNICAL FIELD

The present disclosure relates to an information presentation device, an information presentation method, and a program product for presenting information.

BACKGROUND ART

A typical gaze guidance apparatus is configured to detect an obstacle and the movement of a driver's gaze, display a warning at a position away from the driver's gaze, and guide the movement of the driver's gaze to the obstacle.

SUMMARY

One aspect of the present disclosure is an information presentation apparatus that is mounted in a vehicle. The information presentation apparatus includes: an out-of-vehicle risk detection section that is configured to detect an out-of-vehicle risk object that exists around the vehicle and potentially poses a risk to the vehicle; a gaze detection section that is configured to detect a gaze direction of a driver of the vehicle; a recognition determination section that is configured to determine whether the out-of-vehicle risk object is recognized by the driver based on a detection result by the out-of-vehicle risk detection section and a detection result by the gaze detection section; and an information presentation section that is configured to present, to the driver, out-of-vehicle risk information regarding the out-of-vehicle risk object in a presentation mode. The information presentation section is further configured to change the presentation mode depending on whether the out-of-vehicle risk object is recognized by the driver based on a determination result by the recognition determination section. The recognition determination section is configured to determine that the out-of-vehicle risk object is not recognized by the driver when the out-of-vehicle risk object changes its behavior after the driver changed from a viewing state where the driver was viewing the out-of-vehicle risk object to a non-viewing state where the driver was not viewing the out-of-vehicle risk object.

BRIEF DESCRIPTION OF DRAWINGS

The above and other objects, features and advantages of the present disclosure will become more apparent from the following detailed description made with reference to the accompanying drawings.

FIG. 7 is a table illustrating combinations of reference devices and auxiliary devices.

FIG. 8 is a diagram illustrating a first concrete example of information presentation.

DESCRIPTION OF EMBODIMENTS

Figure 1:
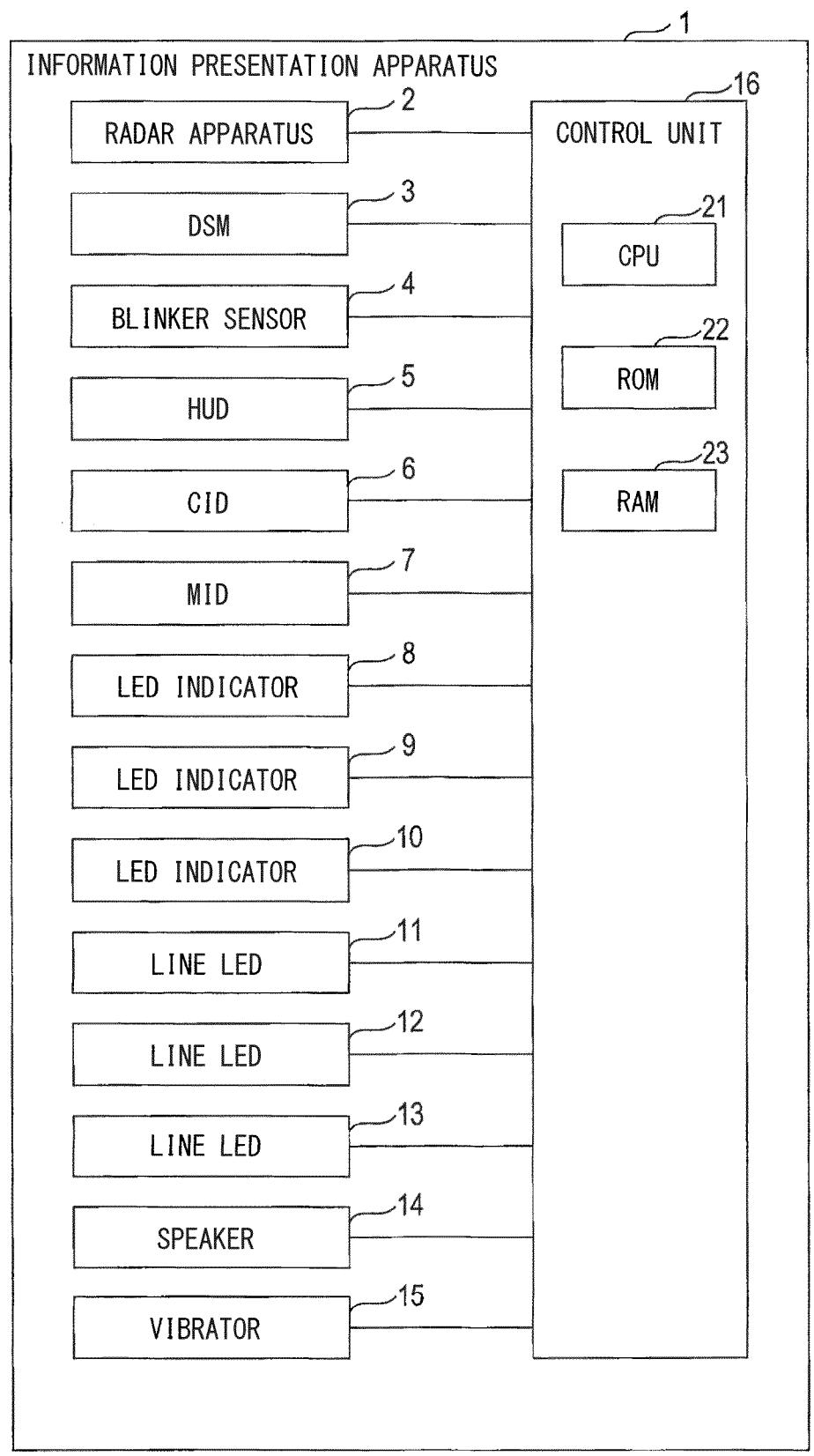
FIG. 1 is a block diagram illustrating a schematic configuration of an information presentation apparatus.

To begin with, a relevant technology will be described only for understanding the following embodiments.

The inventors of the present disclose conducted detailed studies and have found that, when an information presentation apparatus for presenting out-of-vehicle risk information regarding an out-of-vehicle risk to a driver of a vehicle is used to present the out-of-vehicle risk information to the driver while the driver recognizes the out-of-vehicle risk, the driver feels annoyed by such presented information and stops using an out-of-vehicle risk information presentation function.

The present disclosure provides out-of-vehicle risk information while avoiding a situation where the driver feels annoyed.

As described above, according to the one aspect of the present disclosure, an information presentation apparatus that is mounted in a vehicle. The information presentation apparatus includes: an out-of-vehicle risk detection section that is configured to detect an out-of-vehicle risk object that exists around the vehicle and potentially poses a risk to the vehicle; a gaze detection section that is configured to detect a gaze direction of a driver of the vehicle; a recognition determination section that is configured to determine whether the out-of-vehicle risk object is recognized by the driver based on a detection result by the out-of-vehicle risk detection section and a detection result by the gaze detection section; and an information presentation section that is configured to present, to the driver, out-of-vehicle risk information regarding the out-of-vehicle risk object in a presentation mode. The information presentation section is further configured to change the presentation mode depending on whether the out-of-vehicle risk object is recognized by the driver based on a determination result by the recognition determination section. The recognition determination section is configured to determine that the out-of-vehicle risk object is not recognized by the driver when the out-of-vehicle risk object changes its behavior after the driver changed from a viewing state where the driver was viewing the out-of-vehicle risk object to a non-viewing state where the driver was not viewing the out-of-vehicle risk object.

The information presentation apparatus according to the present disclosure, which is configured as described above, changes the presentation mode for the out-of-vehicle risk information depending on whether the out-of-vehicle risk object is recognized by the driver. This enables the information presentation apparatus according to the present disclosure to present the out-of-vehicle risk information in a highlighted manner in a case where the out-of-vehicle risk object is not recognized by the driver, and present the out-of-vehicle risk information in an unhighlighted manner in a case where the out-of-vehicle risk object is recognized by the driver. That is to say, the information presentation apparatus according to the present disclosure is able to present the out-of-vehicle risk information in such a manner as to enable the driver to recognize the out-of-vehicle risk object in the case where the out-of-vehicle risk object is not recognized by the driver, and present the out-of-vehicle risk information in such a manner as to prevent the driver from feeling annoyed in the case where the out-of-vehicle risk object is recognized by the driver.

Consequently, the information presentation apparatus according to the present disclosure is able to present the out-of-vehicle risk information while preventing the driver from feeling annoyed without impairing a function for enabling the driver to recognize the out-of-vehicle risk object.

According to another aspect of the present disclosure, an information presentation method is for presenting information to a driver of a vehicle. The information presentation method includes the steps of: determining whether an out-of-vehicle risk object is recognized by the driver based on a detection result by an out-of-vehicle risk detection section that is configured to detect the out-of-vehicle object and a detection result by a gaze detection section that is configured to detect a gaze direction of the driver, the out-of-vehicle risk object existing around the vehicle and potentially posing a risk to the vehicle; presenting, to the driver, out-of-vehicle risk information regarding the out-of-vehicle risk object in a presentation mode; and changing the presentation mode depending on whether the out-of-vehicle risk object is recognized by the driver. The method further includes determining that the out-of-vehicle risk object is not recognized by the driver when the out-of-vehicle risk object changes its behavior after the driver changed from a viewing state where the driver was viewing the out-of-vehicle risk object to a non-viewing state where the driver was not viewing the out-of-vehicle risk object.

The information presentation method according to the present disclosure is a method executed by the information presentation apparatus according to the present disclosure. Executing the information presentation method according to the present disclosure makes it possible to obtain the same advantageous effects as the information presentation apparatus according to the present disclosure.

According to still another aspect of the present disclosure, a program product is for presenting information to a driver of a vehicle. The program product is embodied on a computer readable storage medium and includes instructions for causing a processor to: determine whether an out-of-vehicle risk object is recognized by the driver based on a detection result by an out-of-vehicle risk detection section that is configured to detect the out-of-vehicle object and a detection result by a gaze detection section that is configured to detect a gaze direction of the driver, the out-of-vehicle risk object existing around the vehicle and potentially posing a risk to the vehicle; present, to the driver, out-of-vehicle risk information regarding the out-of-vehicle risk object in a presentation mode; and change the presentation mode depending on whether the out-of-vehicle risk object is recognized by the driver. The instructions further causes the processor to determine that the out-of-vehicle risk object is not recognized by the driver when the out-of-vehicle risk object changes its behavior after the driver changed from a viewing state where the driver was viewing the out-of-vehicle risk object to a non-viewing state where the driver was not viewing the out-of-vehicle risk object.

The processor controlled by the program product according to the present disclosure is able to configure a part of the information presentation apparatus according to the present disclosure and obtain the same advantageous effects as the information presentation apparatus according to the present disclosure.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

First Embodiment

A first embodiment of the present disclosure will now be described with reference to the accompanying drawings.

An information presentation apparatus 1 according to the first embodiment is mounted in a vehicle. As illustrated in FIG. 1, the information presentation apparatus 1 includes a radar apparatus 2, a DSM 3, a blinker sensor 4, a HUD 5, a CID 6, a MID 7, LED indicators 8, 9, 10, line LEDs 11, 12, 13, a speaker 14, a vibrator 15, and a control unit 16. A vehicle in which the information presentation apparatus 1 is mounted is hereinafter referred to as the host vehicle.

DSM is an acronym for Driver Status Monitor. HUD is an acronym for Head-Up Display. CID is an acronym for Center Information Display. MID is an acronym for Multi Information Display. LED is an acronym for Light Emitting Diode.

The radar apparatus 2 transmits radar waves to the surroundings of a vehicle and receives reflected radar waves to detect the distance R to a target reflecting the radar waves, the speed V of the target, and the direction θ of the target. From the resulting detected values (R, V, θ), the radar apparatus 2 calculates estimated values of horizontal position x, vertical position y, horizontal speed Vx, and vertical speed Vy, and outputs the calculated estimated values to the control unit 16 as detection results (x, y, Vx, Vy).

The DSM 3 captures an image of the face of a driver with a camera, and analyzes the captured image to detect the gaze direction of the driver. The blinker sensor 4 detects whether right blinkers of the vehicle are on or off and whether left blinkers of the vehicle are on or off.

Figure 2:
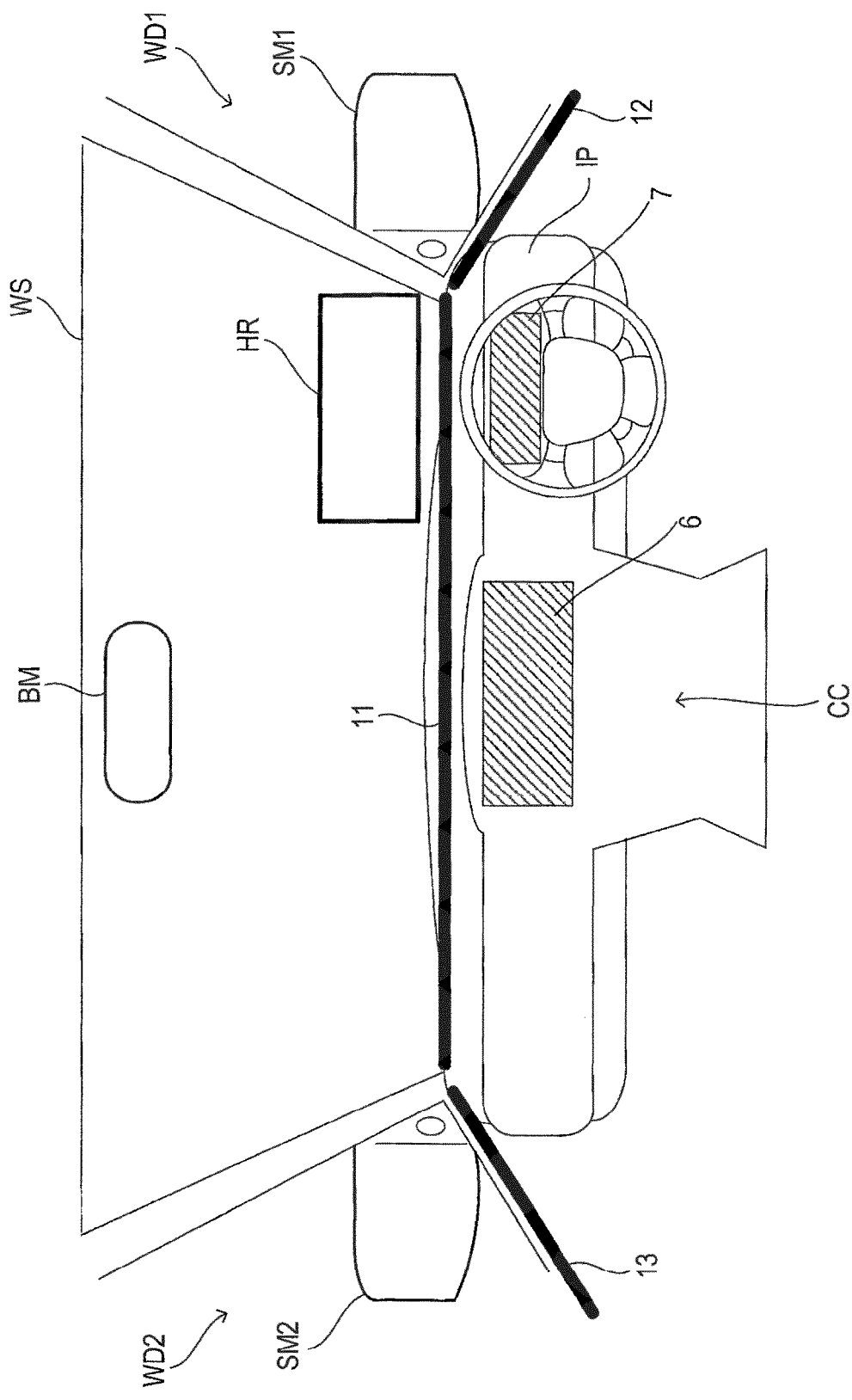
FIG. 2 is a diagram illustrating the arrangement of display devices.

As depicted in FIG. 2, in order to display an image, the HUD 5 radiates display light from below a windshield WS of the vehicle to a HUD display region HR of the windshield WS. As a result, a virtual image is projected onto the windshield WS in order to enable the driver to visually recognize the virtual image in the HUD display region HR with the virtual image superimposed over actual scenery in front of the vehicle.

The CID 6 is placed above a center cluster CC to display various images on a display screen. The MID 7 is mounted on an instrument panel IP disposed in front of a driver's seat, and used to display various vehicle states on a display screen.

The LED indicator 8 is mounted on a mirror surface of a right side mirror SM1. The LED indicator 8 emits light to display an image indicative of a vehicle approaching from the right rear of the host vehicle (hereinafter referred to as the right rear approach image). The LED indicator 9 is mounted on a mirror surface of a left side mirror SM2. The LED indicator 9 emits light to display an image indicative of a vehicle approaching from the left rear of the host vehicle (hereinafter referred to as the left rear approach image). The LED indicator 10 is mounted on a mirror surface of a rearview mirror BM.

The line LEDs 11, 12, 13 are formed by linearly arranging a plurality of LED elements, and configured such that the LED elements can be illuminated and extinguished on an independent basis. The line LED 11 is positioned near the underside of the windshield WS, which is shaped like a rectangle, and disposed along the underside of the windshield WS. The line LED 12 is positioned near the underside of a driver side window WD1 shaped like a rectangle, and disposed along the underside of the driver side window WD1. The line LED 13 is positioned near the underside of a passenger side window WD2 shaped like a rectangle, and disposed along the underside of the passenger side window WD2.

As depicted in FIG. 1, the speaker 14 is installed in a vehicle interior. Upon receiving an electrical audio signal inputted from the control unit 16, the speaker 14 converts the electrical audio signal to a sound, and outputs the sound.

The vibrator 15 is installed in the vehicle interior. The vibrator 15 includes a vibrating motor, and drives the vibrating motor to generate vibration.

The control unit 16 is an electronic control unit that has a configuration centered around a microcomputer including, for example, a CPU 21, a ROM 22, and a RAM 23. Various functions of the microcomputer are implemented when the CPU 21 executes a program stored in a non-transitory, tangible recording medium. In the present example, the ROM 22 corresponds to the non-transitory, tangible recording medium in which the program is stored. Further, executing the program executes a method corresponding to the program. Some or all of the functions to be executed by the CPU 21 may be configured by hardware through the use of, for example, one or more ICs. Furthermore, the control unit 16 may include one or more microcomputers.

The control unit 16 performs various processes based on inputs from the radar apparatus 2, the DSM 3, and the blinker sensor 4 in order to control the HUD 5, the CID 6, the MID 7, the LED indicators 8, 9, 10, the line LEDs 11, 12, 13, the speaker 14, and the vibrator 15.

Figure 3:
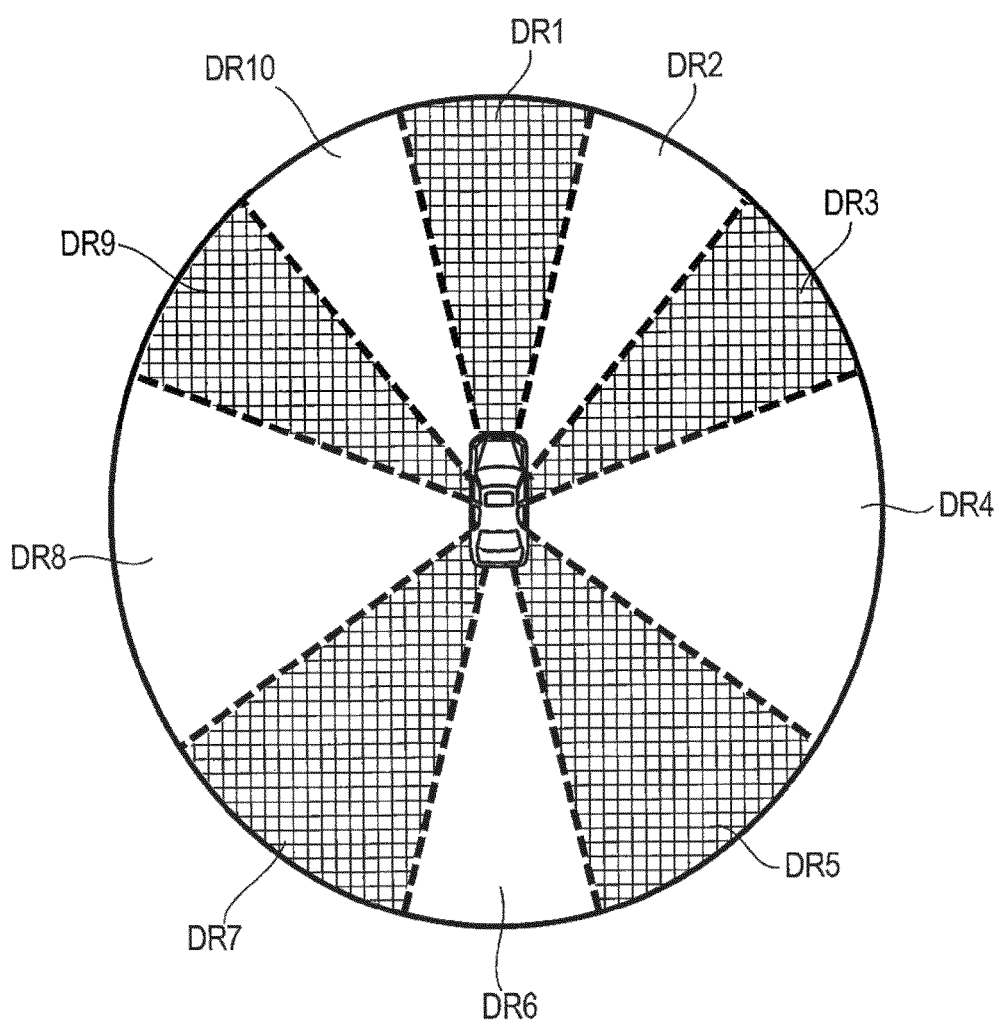
FIG. 3 is a diagram illustrating direction ranges.

The direction of an object existing around the host vehicle is defined as described below. As depicted in FIG. 3, the direction centered around the host vehicle is classified into one of direction ranges DR1, DR2, DR3, DR4, DR5, DR6, DR7, DR8, DR9, and DR10, which are arranged clockwise from the direction of travel of the host vehicle. The direction range DR1 is hereinafter referred to also as front forward. The direction range DR2 is hereinafter referred to also as right forward. The direction range DR3 is hereinafter referred to also as right front sideward. The direction range DR4 is hereinafter referred to also as right sideward. The direction range DR5 is hereinafter referred to also as right rear sideward. The direction range DR6 is hereinafter referred to also as front rearward. The direction range DR7 is hereinafter referred to also as left rear sideward. The direction range DR3 is hereinafter referred to also as left sideward. The direction range DR9 is hereinafter referred to also as left front sideward. The direction range DR10 is hereinafter referred to also as left forward.

The following describes the steps that are performed by the CPU 21 of the control unit 16 during a first information presentation process. The first information presentation process is repeatedly performed while the control unit 16 operates.

Figure 4:
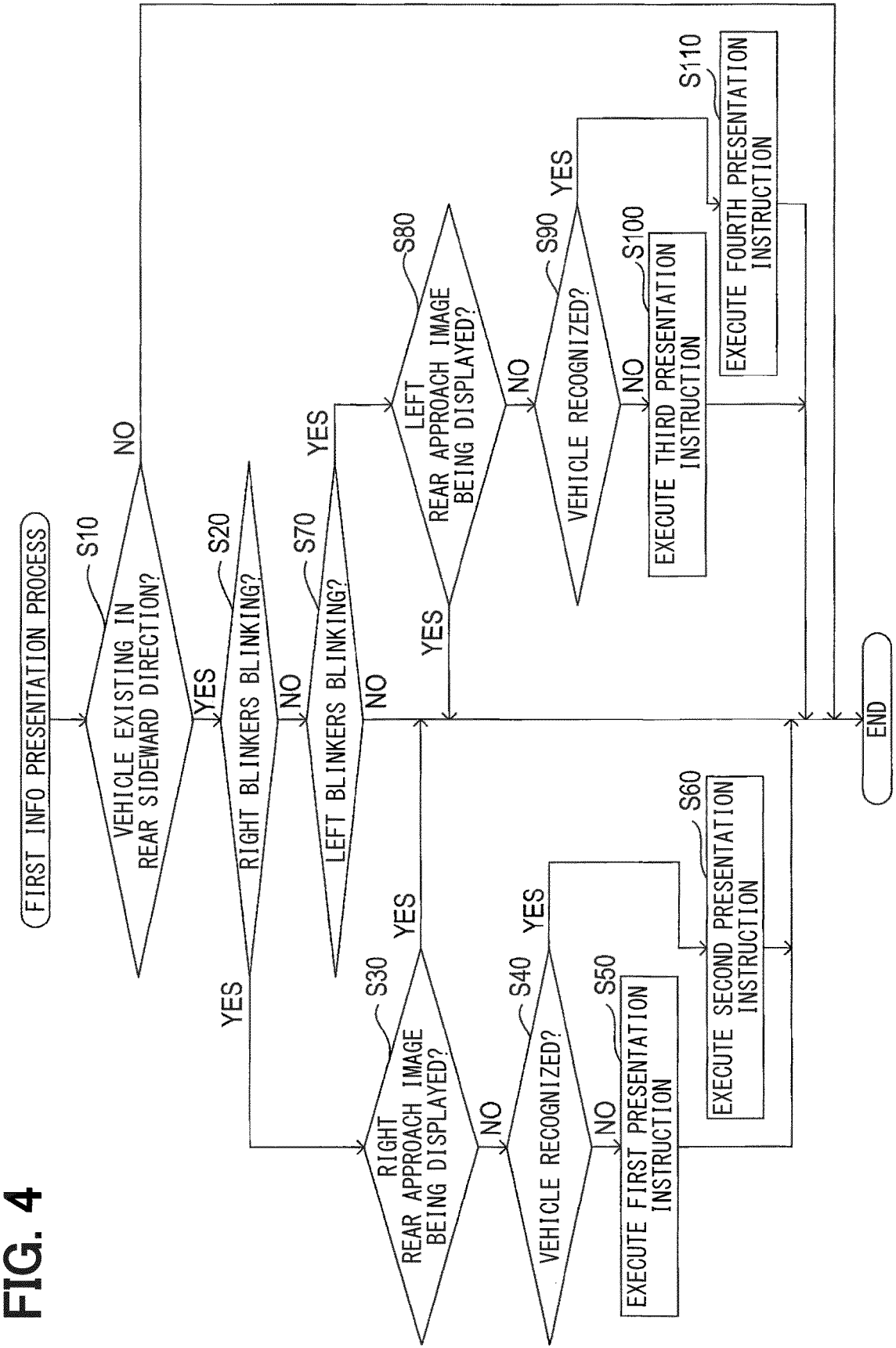
FIG. 4 is a flowchart illustrating a first information presentation process.

When the first information presentation process starts, the CPU 21 first performs step S10 as depicted in FIG. 4. In step S10, based on the result of detection by the radar apparatus 2, the CPU 21 determines whether a vehicle exists in the rear sideward direction of the host vehicle (i.e., whether a vehicle exists in the direction range DR5 or DR7). If, in step S10, no vehicle exists in the rear sideward direction of the host vehicle, the CPU 21 terminates the first information presentation process. Meanwhile, if a vehicle exists in the rear sideward direction of the host vehicle, the CPU 21 proceeds to step S20. In step S20, based on the result of detection by the blinker sensor 4, the CPU 21 determines whether the right blinkers are blinking.

If, in step S20, the right blinkers are blinking, the CPU 21 proceeds to step S30. In step S30, the CPU 21 determines whether the right rear approach image is displayed by the HUD 5. If, in step S30, the right rear approach image is displayed by the HUD 5, the CPU 21 terminates the first information presentation process. Meanwhile, if the right rear approach image is not displayed by the HUD 5, the CPU 21 proceeds to step S40. In step S40, based on the result of determination in a later-described recognition determination process, the CPU 21 determines whether the vehicle existing in the rear sideward direction of the host vehicle is recognized by the driver. If, in step S40, the vehicle existing in the rear sideward direction of the host vehicle is not recognized by the driver, the CPU 21 proceeds to step S50. In step S50, the CPU 21 executes a first presentation instruction, and then terminates the first information presentation process. More specifically, by executing the first presentation instruction, the CPU 21 outputs an instruction for displaying the right rear approach image to the HUD 5, outputs an electrical audio signal indicative of a warning sound to the speaker 14, outputs an instruction for vibration to the vibrator 15, and outputs an instruction for blinking to the LED indicator 8. This causes the HUD 5 to display the right rear approach image, the speaker 14 to output the warning sound, the vibrator 15 to vibrate, and the LED indicator 8 to display the right rear approach image in a blinking manner.

Meanwhile, if the vehicle existing in the rear sideward direction of the host vehicle is recognized by the driver, the CPU 21 proceeds to step S60. In step S60, the CPU 21 executes a second presentation instruction, and then terminates the first information presentation process. More specifically, by executing the second presentation instruction, the CPU 21 outputs an instruction for steady illumination to the LED indicator 8. This causes the LED indicator 8 to steadily display the right rear approach image.

Further, if the right blinkers are not blinking in step S20, the CPU 21 proceeds to step S70. In step S70, based on the result of detection by the blinker sensor 4, the CPU 21 determines whether the left blinkers are blinking.

If, in step S70, the left blinkers are not blinking, the CPU 21 terminates the first information presentation process. Meanwhile, if the left blinkers are blinking, the CPU 21 proceeds to step S80. In step S80, the CPU 21 determines whether the left rear approach image is displayed by the HUD 5. If, in step S80, the left rear approach image is displayed by the HUD 5, the CPU 21 terminates the first information presentation process. Meanwhile, if the left rear approach image is not displayed by the HUD 5, the CPU 21 proceeds to step S90. In step S90, based on the result of determination in the recognition determination process, the CPU 21 determines whether the vehicle existing in the rear sideward direction of the host vehicle is recognized by the driver. If, in step S90, the vehicle existing in the rear sideward direction of the host vehicle is not recognized by the driver, the CPU 21 proceeds to step S100. In step S100, the CPU 21 executes a third presentation instruction, and then terminates the first information presentation process. More specifically, by executing the third presentation instruction, the CPU 21 outputs an instruction for displaying the left rear approach image to the HUD 5, outputs the electrical audio signal indicative of the warning sound to the speaker 14, outputs an instruction for vibration to the vibrator 15, and outputs an instruction for blinking to the LED indicator 9. This causes the HUD 5 to display the left rear approach image, the speaker 14 to output the warning sound, the vibrator 15 to vibrate, and the LED indicator 9 to display the left rear approach image in a blinking manner.

Meanwhile, if the vehicle existing in the rear sideward direction of the host vehicle is recognized by the driver, the CPU 21 proceeds to step S110. In step S110, the CPU 21 executes a fourth presentation instruction, and then terminates the first information presentation process. More specifically, by executing the fourth presentation instruction, the CPU 21 outputs an instruction for steady illumination to the LED indicator 9. This causes the LED indicator 9 to steadily display the left rear approach image.

Figure 5:
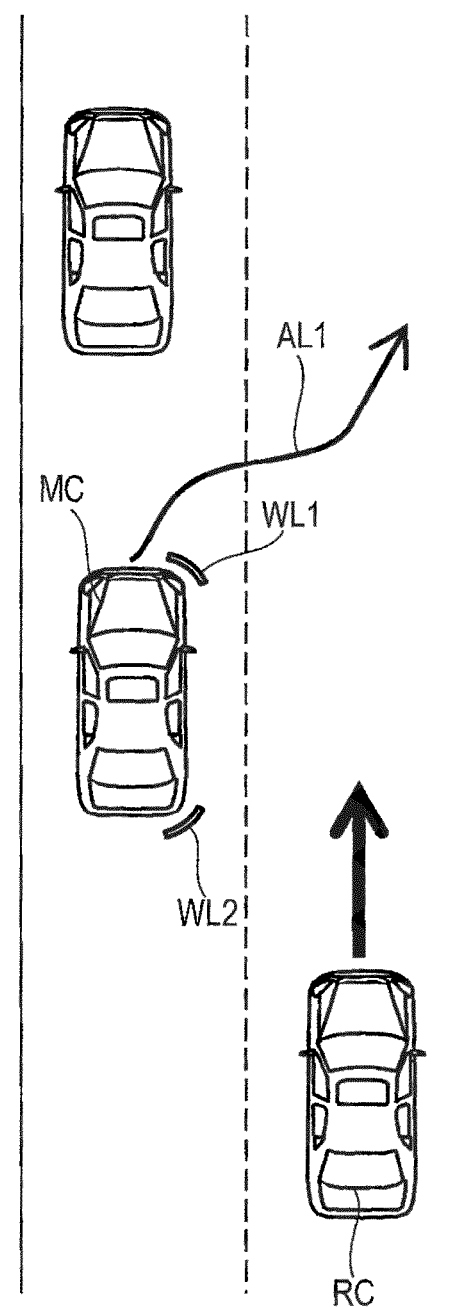
FIG. 5 is a diagram illustrating a situation where a host vehicle is attempting to make a rightward lane change.

If, as depicted, for example, in FIG. 5, a vehicle RC exists in the right rear sideward direction of a host vehicle MC and the right blinkers of the host vehicle MC are blinking for making a rightward lane change, the first information presentation process causes the CPU 21 to determine whether to execute the various instructions. In FIG. 5, blinker light WL1 and blinker light WL2 indicate that the right blinkers of the host vehicle MC are blinking, and an arrow AL1 indicates that the host vehicle MC is about to make a rightward lane change.

The following describes the steps that are performed by the CPU 21 of the control unit 16 during a second information presentation process. The second information presentation process is repeatedly performed while the control unit 16 operates.

Figure 6:
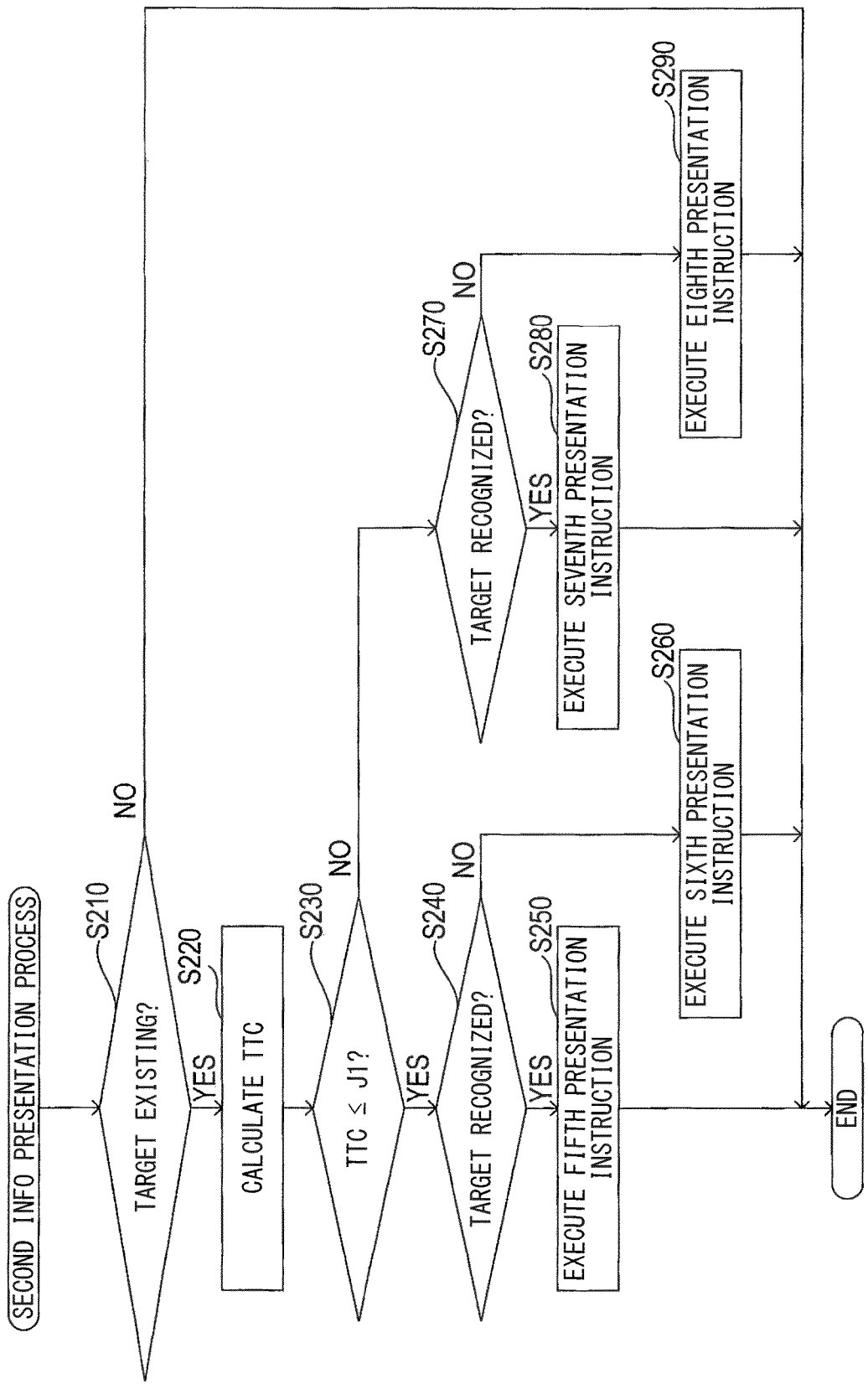
FIG. 6 is a flowchart illustrating a second information presentation process.

When the second information presentation process starts, the CPU 21 first performs step S210 as depicted in FIG. 6. In step S210, based on the result of detection by the radar apparatus 2, the CPU 21 determines whether a target exists around the host vehicle. If, in step S210, no target exists around the host vehicle, the CPU 21 terminates the second information presentation process. Meanwhile, if a target exists around the host vehicle, the CPU 21 proceeds to step S220. In step S220, based on the result of detection by the radar apparatus 2, the CPU 21 calculates a predicted collision time TTC. TTC is an acronym for Time To Collision, and indicative of the predicted time remaining before a possible collision between the target for determination in step S210 (hereinafter referred to as the target object) and the host vehicle.

Next, in step S230, the CPU 21 determines whether the predicted collision time TTC calculated in step S220 is equal to or shorter than a preset risk judgment value J1. More specifically, if the predicted collision time TTC is equal to or shorter than the risk judgment value J1, the CPU 21 determines that the degree of risk is high. Meanwhile, if the predicted collision time TTC is longer than the risk judgment value J1, the CPU 21 determines that the degree of risk is low.

If, in step S230, the predicted collision time TTC is equal to or shorter than the risk judgment value J1, the CPU 21 proceeds to step S240. In step S240, based on the result of determination in the later-described recognition determination process, the CPU 21 determines whether the target object is recognized by the driver.

If, in step S240, the target object is recognized by the driver, the CPU 21 proceeds to step S250. In step S250, the CPU 21 executes a fifth presentation instruction, and then terminates the second information presentation process. More specifically, by executing the fifth presentation instruction, the CPU 21 outputs a presentation instruction to a display device disposed near in the direction in which the target object exists (hereinafter referred to as the risk direction). For example, in a case where the target object exists in the right sideward direction of the host vehicle (i.e., in the direction range DR4) and is recognized by the driver, the CPU 21 blinks the line LED 12 installed to the right of the driver.

Meanwhile, if the target object is not recognized by the driver, the CPU 21 proceeds to step S260. In step S260, the CPU 21 executes a sixth presentation instruction, and then terminates the second information presentation process. More specifically, by executing the sixth presentation instruction, the CPU 21 outputs four instructions described below. As the first instruction, the CPU 21 outputs an electrical audio signal indicative of the warning sound to the speaker 14. As the second instruction, the CPU 21 outputs, to the vibrator 15, an instruction for vibrating the vibrator 15 at a high frequency. As the third instruction, the CPU 21 outputs an instruction for displaying information indicative of the risk direction to a display device disposed near in the gaze direction of the driver. As the fourth instruction, the CPU 21 outputs an instruction for attracting a driver's attention (e.g., blinking an LED or an icon) to the display device disposed near in the risk direction.

Further, if, in step S230, the risk judgment value J1 is exceeded by the predicted collision time TTC, the CPU 21 proceeds to step S270. In step S270, based on the result of determination in the recognition determination process, the CPU 21 determines whether the target object is recognized by the driver.

If, in step S270, the target object is recognized by the driver, the CPU 21 proceeds to step S280. In step S280, the CPU 21 executes a seventh presentation instruction, and then terminates the second information presentation process. More specifically, by executing the seventh presentation instruction, the CPU 21 outputs a presentation instruction to the display device disposed near in the risk direction. For example, in a case where the target object exists in the right sideward direction of the host vehicle (i.e., in the direction range DR4) and is recognized by the driver, the CPU 21 steadily illuminates the line LED 12 installed to the right of the driver.

Meanwhile, if the target object is not recognized by the driver, the CPU 21 proceeds to step S290. In step S290, the CPU 21 executes an eighth presentation instruction, and then terminates the second information presentation process. More specifically, by executing the eighth presentation instruction, the CPU 21 outputs four instructions described below. As the first instruction, the CPU 21 outputs an electrical audio signal indicative of the warning sound to the speaker 14. As the second instruction, the CPU 21 outputs, to the vibrator 15, an instruction for vibrating the vibrator 15 at a low frequency. As the third instruction, the CPU 21 outputs an instruction for displaying information indicative of the risk direction to the display device disposed near in the gaze direction of the driver. As the fourth instruction, the CPU 21 outputs an instruction for attracting a driver's attention (e.g., steadily illuminating an LED or an icon) to the display device disposed near in the risk direction.

The following describes the combinations of devices used for presentation regarding the first and third presentation instructions in the first information presentation process and the sixth and eighth presentation instructions in the second information presentation process.

As indicated in FIG. 7, the combinations of reference devices and auxiliary devices are used for presentation regarding the sixth and eighth presentation instructions. Numerals indicated in individual fields of FIG. 7 are the symbols of components of the information presentation apparatus 1. For example, "5" denotes the HUD 5. "11" denotes the line LED 11. The reference devices are selected based on the risk direction. The auxiliary devices are selected based on the gaze direction of the driver.

When the risk direction is front forward, the reference device is the HUD 5. When the risk direction is right forward, left forward, right front sideward, or left front sideward, the reference device is the line LED 11. When the risk direction is right sideward, the reference device is the line LED 12. When the risk direction is left sideward, the reference device is the line LED 13, When the risk direction is right rear sideward, the reference device is the LED indicator 8. When the risk direction is left rear sideward, the reference device is the LED indicator 9. When the risk direction is front rearward, the reference device is the LED indicator 10.

Further, when the gaze direction of the driver is front forward, the auxiliary devices are the speaker 14, the vibrator 15, and the HUD 5. However, if the risk direction is front forward, no auxiliary devices are used.

When the gaze direction of the driver is right forward, the auxiliary devices are the speaker 14, the vibrator 15, and the line LED 11. However, if the risk direction is right forward, no auxiliary devices are used.

When the gaze direction of the driver is left forward, the auxiliary devices are the speaker 14 the vibrator 15, and the line LED 11. However, if the risk direction is left forward, no auxiliary devices are used.

When the gaze direction of the driver is right front sideward, the auxiliary devices are the speaker 14, the vibrator 15, and the line LED 11. However, if the risk direction is right front sideward, no auxiliary devices are used.

When the gaze direction of the driver is left front sideward, the auxiliary devices are the speaker 14, the vibrator 15, and the line LED 11. However, if the risk direction is left front sideward, no auxiliary devices are used.

When the gaze direction of the driver is right sideward, the auxiliary devices are the speaker 14, the vibrator 15, and the line LED 12. However, if the risk direction is right sideward, no auxiliary devices are used.

When the gaze direction of the driver is left sideward, the auxiliary devices are the speaker 14. the vibrator 15, and the line LED 13. However, if the risk direction is left sideward, no auxiliary devices are used.

When the gaze direction of the driver is right rear sideward, the auxiliary devices are the speaker 14, the vibrator 15, and the line LED 12. However, if the risk direction is right rear sideward, no auxiliary devices are used.

When the gaze direction of the driver is left rear sideward, the auxiliary devices are the speaker 14, the vibrator 15, and the line LED 13. However, if the risk direction is left rear sideward, no auxiliary devices are used.

When the gaze direction of the driver is front rearward, the auxiliary devices are the speaker 14, the vibrator 15, and the HUD 5. However, if the risk direction is front rearward, no auxiliary devices are used. Further, if the risk direction is front forward, the HUD 5 is not used as an auxiliary device. In this case, the driver is first prompted to look forward as the speaker 14 emits the warning sound and the vibrator 15 vibrates, and then guided to the risk direction by the HUD 5.

For example, a field C1 indicates an auxiliary device that is used when the risk direction is front forward and the gaze direction of the driver is front forward. Since the field C1 is marked "none," no auxiliary device is used. That is to say, the HUD 5, which is the reference device, is used. In this case, the HUD display region HR displays the message "Watch Ahead" as depicted, for example, in FIG. 8.

Further, a field C2 indicates auxiliary devices that are used when the risk direction is right rear sideward and the gaze direction of the driver is front forward. Since the field C2 is marked "+14/15+5," the speaker 14, the vibrator 15, and the HUD 5 are used as the auxiliary devices. Additionally, the LED indicator 8 is used as the reference device. In this case, the right rear approach image appears in the HUD display region HR and on the mirror surface of the right side mirror SM1, and the speaker 14 outputs the warning sound. Moreover, the vibrator 15 vibrates.

Figure 10:
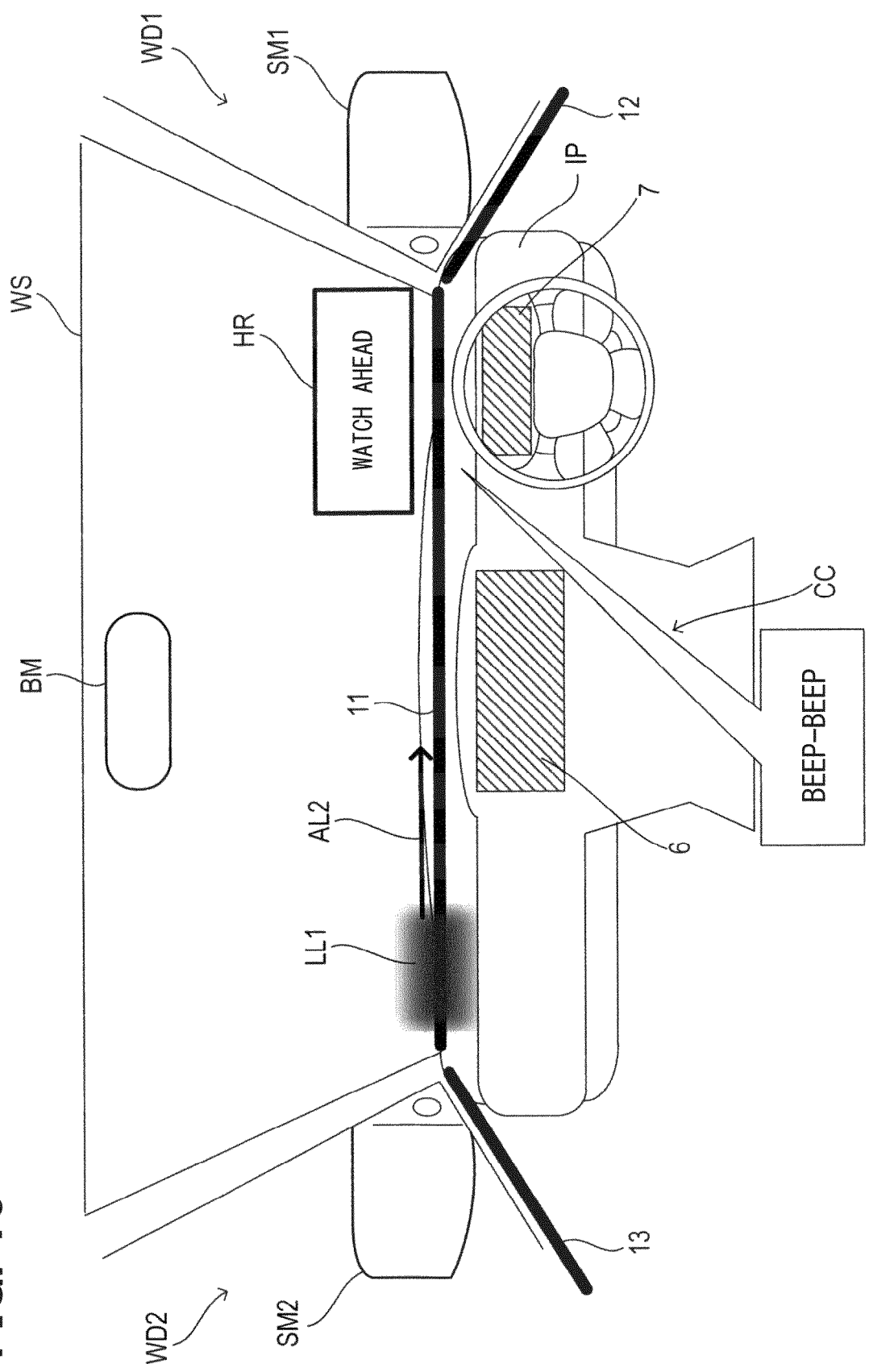
FIG. 10 is a diagram illustrating a third concrete example of information presentation.

Further, a field C3 indicates auxiliary devices that are used when the risk direction is front forward and the gaze direction of the driver is left front sideward, Since the field C3 is marked "+14/15+11," the speaker 14, the vibrator 15, and the line LED 11 are used as the auxiliary devices. Additionally, the HUD 5 is used as the reference device. In this case, as depicted, for example, in FIG. 10, the HUD display region HR displays the message "Watch Ahead," and the speaker 14 outputs the warning sound. Furthermore, the vibrator 15 vibrates. Moreover, as indicated by an arrow AL2, the line LED 11 illuminates in such a manner that light LL1 moves from the left end of the line LED 11 to a region directly below the HUD display region HR.

Further, a field C4 indicates auxiliary devices that are used when the risk direction is right front sideward and the gaze direction of the driver is left rear sideward. Since the field C4 is marked "+14/15+13," the speaker 14, the vibrator 15, and the line LED 13 are used as the auxiliary devices. Additionally, the line LED 11 is used as the reference device. In this case, as depicted, for example, in FIG. 11, the speaker 14 outputs the warning sound. Furthermore, the vibrator 15 vibrates. Moreover, as indicated by an arrow AL3, the line LED 13 illuminates in such a manner that light LL2 moves from the rear end of the line LED 13 to the front end. When the light LL2 reaches the front end of the line LED 13, the line LED 11 illuminates in such a manner that light LL3 moves from the left end of the line LED 11 to the right end as indicated by an arrow AL4. In a case where the target exists at a position different from the positions of the ends of the line LED 11 as viewed from the driver, the light of the line LED 11 does not always need to move to an end of the line LED 11 (i.e., the light may stop moving at a position near the target). Further, in a case where the HUD display region HR displays information, the gaze of the driver may be guided to the HUD display region HR instead of the position of the target.

The following describes the steps that are performed by the CPU 21 of the control unit 16 during the recognition determination process. The recognition determination process is repeatedly performed while the control unit 16 operates.

Figure 12:
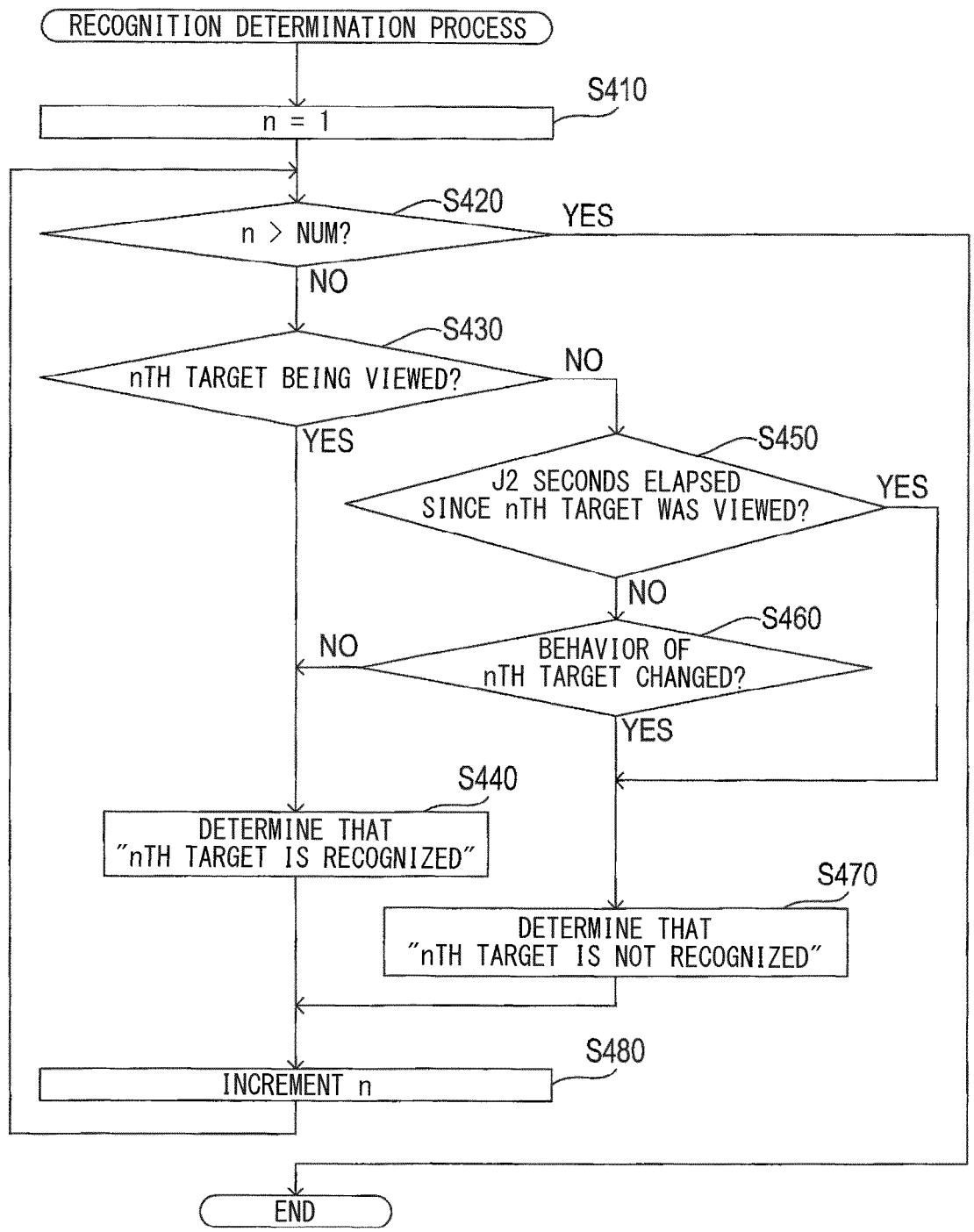
FIG. 12 is a flowchart illustrating a recognition determination process according to a first embodiment.

When the recognition determination process starts, the CPU 21 first performs step S410 as depicted in FIG. 12. In step S410, the CPU 21 sets a target indicator value n stored in the RAM 23 to 1. Next, in step S420, the CPU 21 determines whether the target indicator value n is greater than a target count NUM. The target count NUM indicates the total number of targets currently detected by the radar apparatus 2. If, in step S420, the target indicator value n is greater than the target count NUM, the CPU 21 terminates the recognition determination process.

Meanwhile, if the target indicator value n is equal to or smaller than the target count NUM, the CPU 21 proceeds to step S430. In step S430, based on the result of detection by the DSM 3, the CPU 21 determines whether the driver is viewing the $n^{th}$ target. If, in step S430, the driver is viewing the $n^{th}$ target, the CPU 21 proceeds to step S440. In step S440, the CPU 21 determines that "the $n^{th}$ target is recognized by the driver," and then proceeds to step S480.

Meanwhile, if the driver is not viewing the $n^{th}$ target, the CPU 21 proceeds to step S450. In step S450, the CPU 21 determines whether a predetermined recognition determination time J2 (e.g., 5 seconds in the present embodiment) has elapsed since the $n^{th}$ target was viewed by the driver.

If it is determined in step S450 that the recognition determination time J2 has elapsed, the CPU 21 proceeds to step S470. Meanwhile, if the recognition determination time J2 has not elapsed, the CPU 21 proceeds to step S460. In step S460, the CPU 21 determines whether the behavior of the $n^{th}$ target is changed while the $n^{th}$ target is not viewed by the driver. More specifically, if a change occurred in at least one of the direction of target movement, the relative position between the target and the host vehicle, and the speed of the target, the CPU 21 determines that the behavior of the target is changed.

Figure 13:
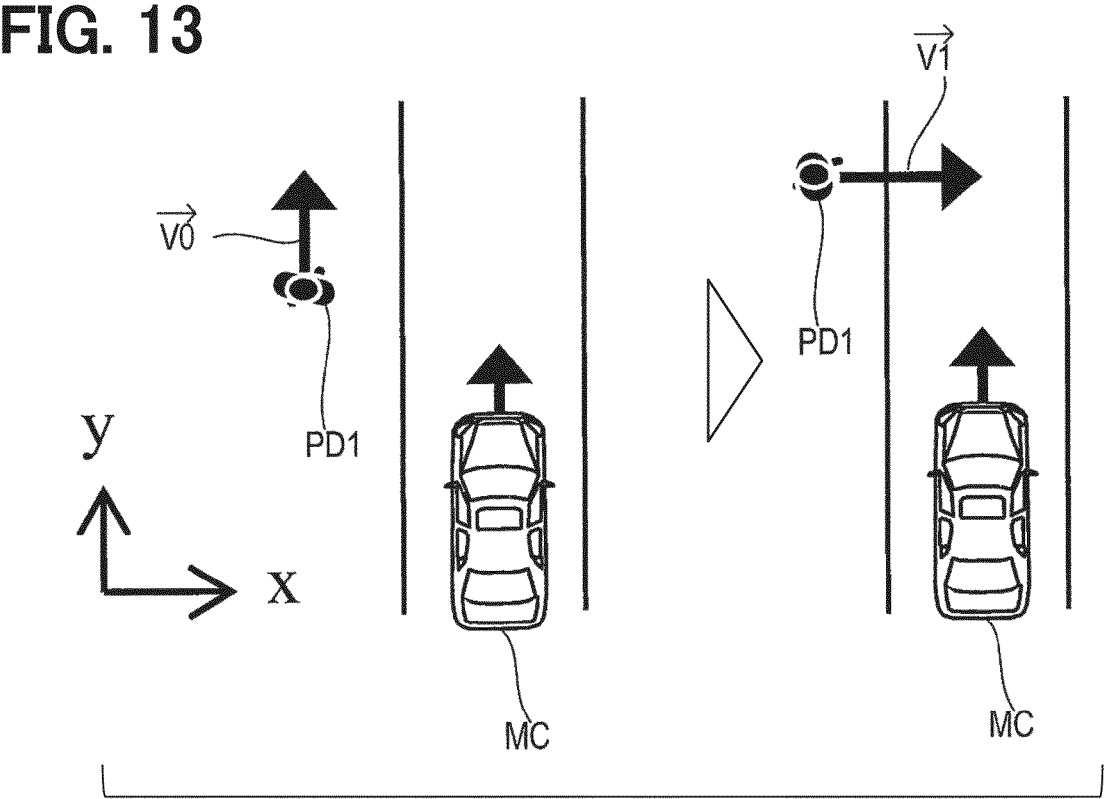
FIG. 13 is a diagram illustrating a first concrete example of a change in the direction of target movement.
Figure 14:
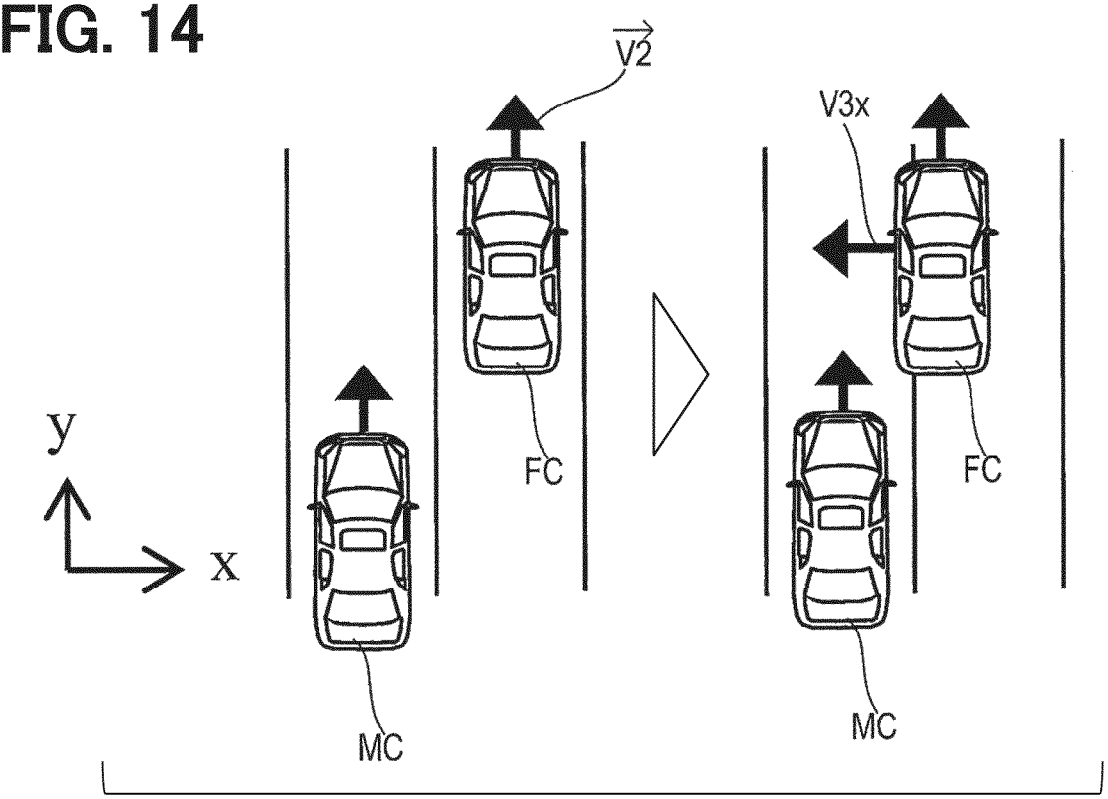
FIG. 14 is a diagram illustrating a second concrete example of the change in the direction of target movement.

The direction of target movement is determined to be changed in a case where, for example, a pedestrian PD1 walking along the travel direction of the host vehicle MC begins to cross a road as depicted in FIG. 13. Here, it is assumed that the vehicle width direction component of a movement vector V0 of the pedestrian PD1 before crossing is V0x, and that the vehicle width direction component of a movement vector V1 of the pedestrian PD1 during crossing is V1x. When (V1x–V0x) is greater than a preset first change judgment value, the CPU 21 determines that the behavior of the target is changed.

Further, the direction of target movement is also determined to be changed, for example, in a case where a preceding vehicle FC traveling in a lane adjacent to the lane the host vehicle MC is in begins to cut in the lane the host vehicle MC is in. Here, it is assumed that the vehicle width direction component of a movement vector V2 of the preceding vehicle FC before cutting in is V2x, and that the vehicle width direction component of the movement vector of the preceding vehicle FC at the time of cutting in is V3x. When (V3x–V2x) is greater than a preset second change judgment value, the CPU 21 determines that the behavior of the target is changed.

Furthermore, the direction of target movement is also determined to be changed, for example, in a case where a following vehicle traveling in the same lane as the host vehicle begins to move to an adjacent lane and approach the host vehicle.

Figure 15:
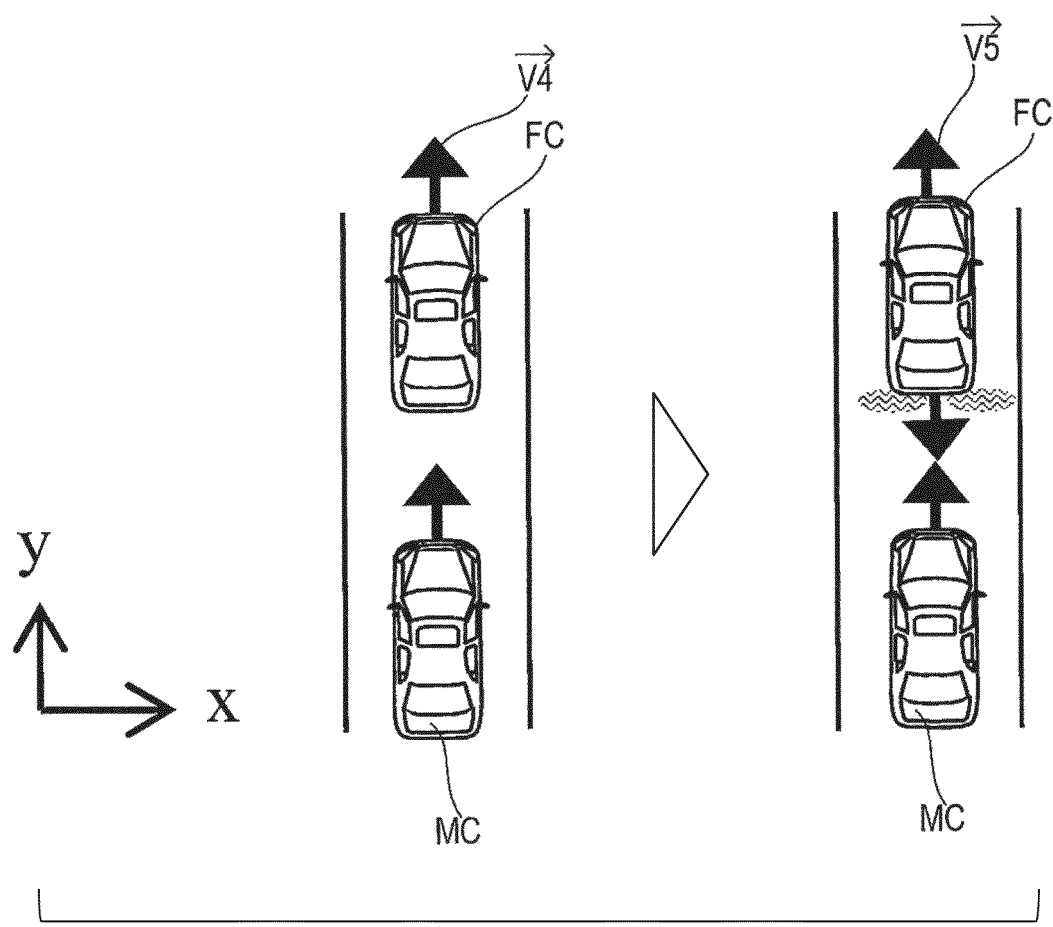
FIG. 15 is a diagram illustrating a concrete example of a change in the speed of a target.

The speed of the target is determined to be changed in a case where, for example, a preceding vehicle FC traveling in the same lane as the host vehicle MC begins to reduce its speed as depicted in FIG. 15. Here, it is assumed that the travel direction component of a movement vector V4 of the preceding vehicle FC before its speed reduction is V4y, and that the travel direction component of a movement vector V5 of the preceding vehicle FC at the time of its speed reduction is V5y. When (V5y–V4y) is greater than a preset third change judgment value, the CPU 21 determines that the behavior of the target is changed.

Further, the speed of the target is also determined to be changed, for example, in a case where a vehicle existing in the rear sideward direction of the host vehicle begins to accelerate and approach the host vehicle. In this instance, based on the difference in the travel direction component of a movement vector, the CPU 21 determines whether the behavior of the target is changed, as is the case with a reduction in the speed of a preceding vehicle.

Furthermore, the speed of the target is also determined to be changed, for example, in a case where a vehicle entering an intersection from another roadway begins to accelerate or a pedestrian walking near the host vehicle suddenly starts running. In such an instance, based on the difference in the vehicle width direction component of a movement vector, the CPU 21 determines whether the behavior of the target is changed.

Subsequently, if it is determined in step S460 that the behavior of the nth target is not changed, the CPU 21 proceeds to step S440 as depicted in FIG. 12. Meanwhile, if it is determined that the behavior of the $n^{th}$ target is changed, the CPU 21 proceeds to step S470.

In step S470, the CPU 21 determines that "the $n^{th}$ target is not recognized by the driver," and then proceeds to step S480. In step S480, the CPU 21 increments the target indicator value n by one (i.e., adds a value of 1 to the target indicator value n), and then proceeds to step S420.

Concrete examples of information presentation by the information presentation apparatus 1 will now be described.

Figure 16:
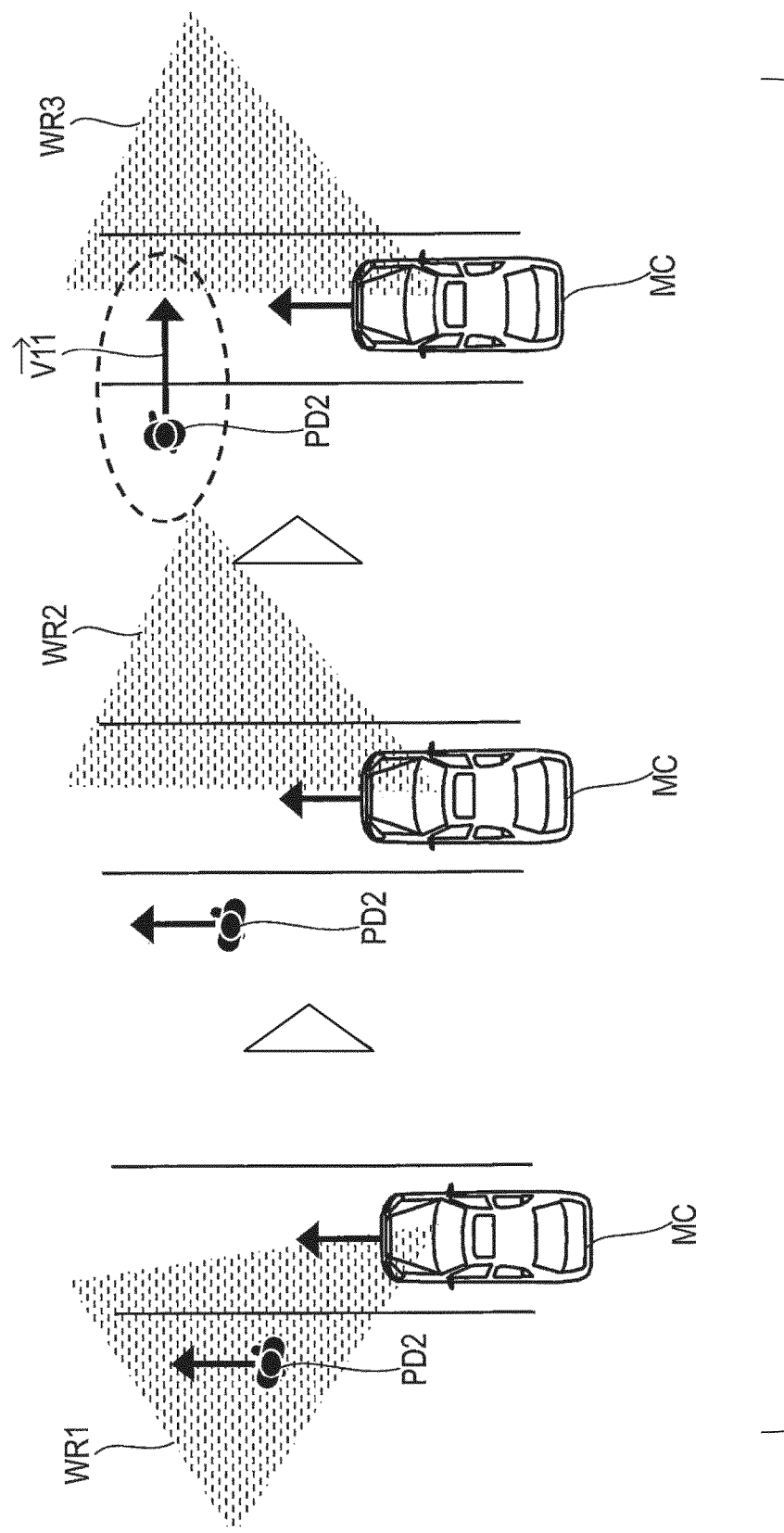
FIG. 16 is a diagram illustrating a first concrete example of a driver's failure to notice a target.

Here, first of all, it is assumed as depicted in FIG. 16 that a pedestrian PD2 walking on the left side of the host vehicle MC along the travel direction of the host vehicle MC is visually recognized by the driver of the host vehicle MC. In FIG. 16, the pedestrian PD2 is included in a watch range WR1 to indicate that the pedestrian PD2 is visually recognized by the driver of the host vehicle MC.

Subsequently, the gaze of the driver of the host vehicle MC is moved. In FIG. 16, a watch range WR2 indicates that the gaze of the driver of the host vehicle MC is moved. In the resulting state, the pedestrian PD2 is not visually recognized by the driver of the host vehicle MC.

Now, it is assumed that the pedestrian PD2 begins to cross a road immediately after the move of the gaze of the driver of the host vehicle MC. A movement vector V11 indicates that the pedestrian PD2 has begun to cross the road. Further, the pedestrian PD2 is not included in a watch range WR3. This indicates that the pedestrian PD2 is not visually recognized by the driver of the host vehicle MC.

Figure 17:
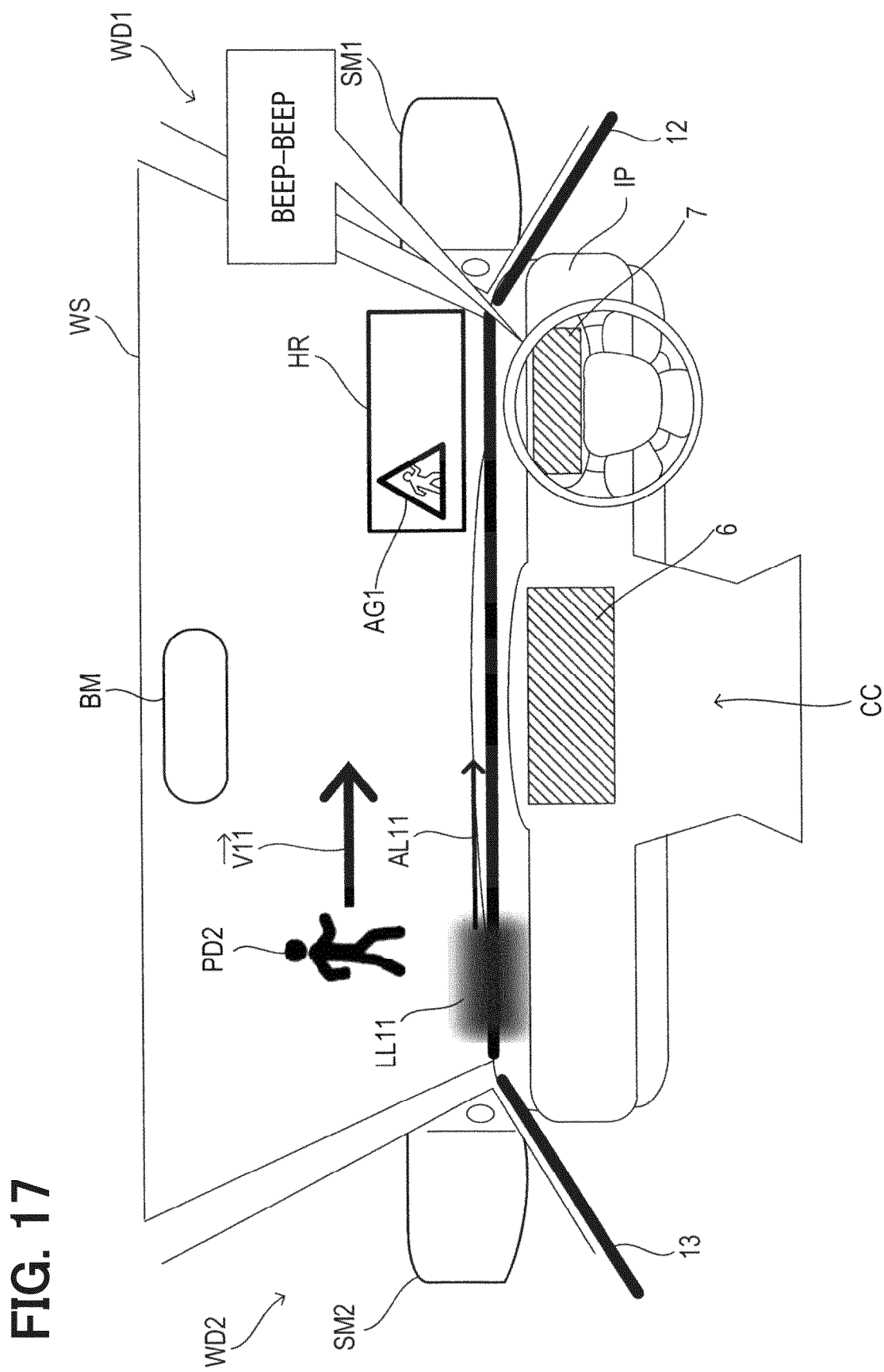
FIG. 17 is a diagram illustrating a fifth concrete example of information presentation.

In the above case, the speaker 14 emits the warning sound as depicted in FIG. 17. Further, the vibrator 15 vibrates. Furthermore, the HUD display region HR displays a warning image AG1 indicative of the approaching pedestrian. Moreover, the line LED 11 illuminates in such a manner that light LL11 moves from the left end of the line LED 11 to a region directly below the HUD display region HR as indicated by an arrow AL11.

Figure 18:
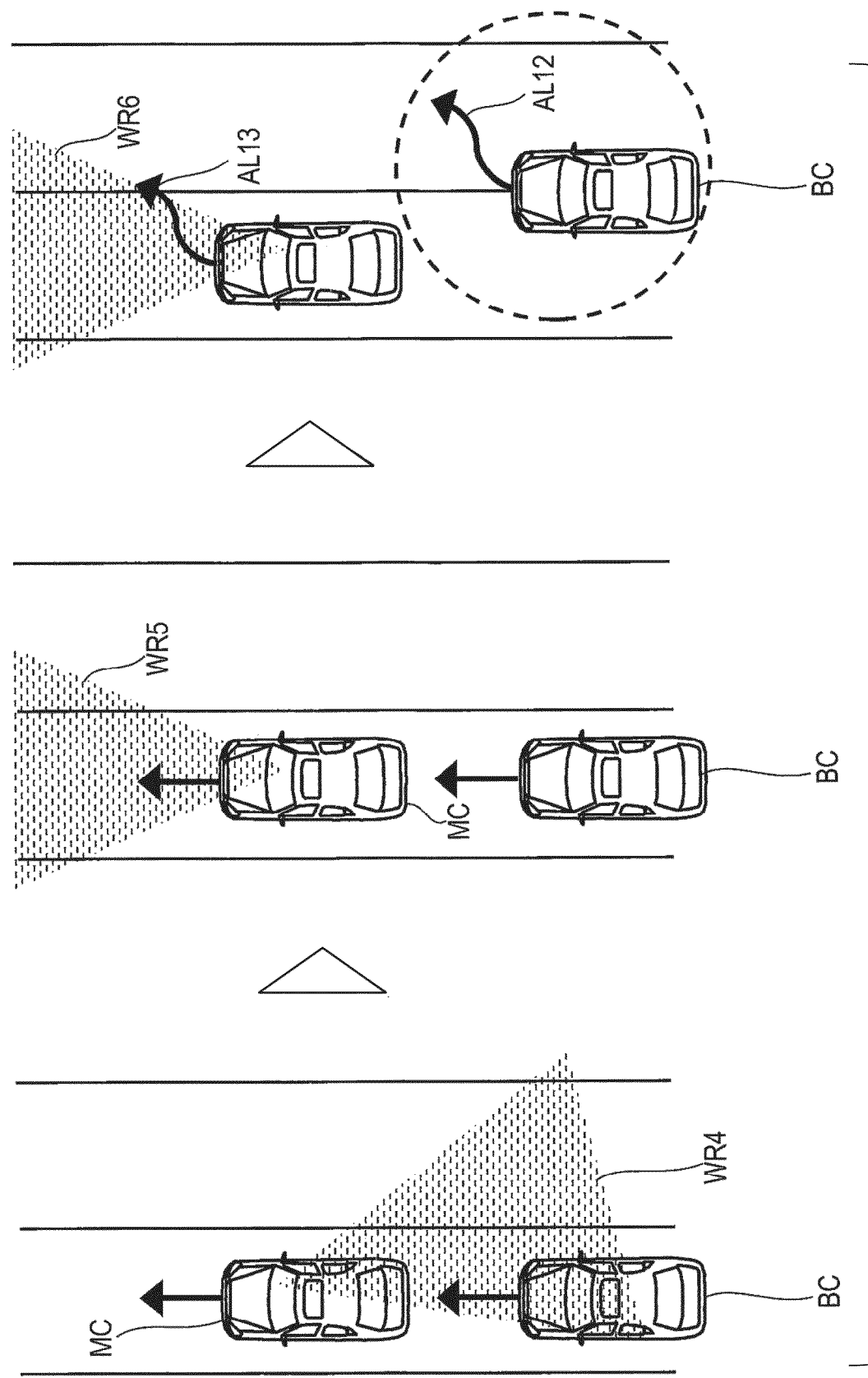
FIG. 18 is a diagram illustrating a second concrete example of the driver's failure to notice a target.

Next, it is assumed that a following vehicle BC is traveling in the same lane as the host vehicle MC as depicted in FIG. 18. In FIG. 18, the following vehicle BC is included in a watch range WR4 to indicate that the following vehicle BC is visually recognized by the driver of the host vehicle MC.

Subsequently, the gaze of the driver of the host vehicle MC is moved. In FIG. 18, a watch range WR5 indicates that the gaze of the driver of the host vehicle MC is moved. In the resulting state, the following vehicle BC is not visually recognized by the driver of the host vehicle MC.

Figure 9:
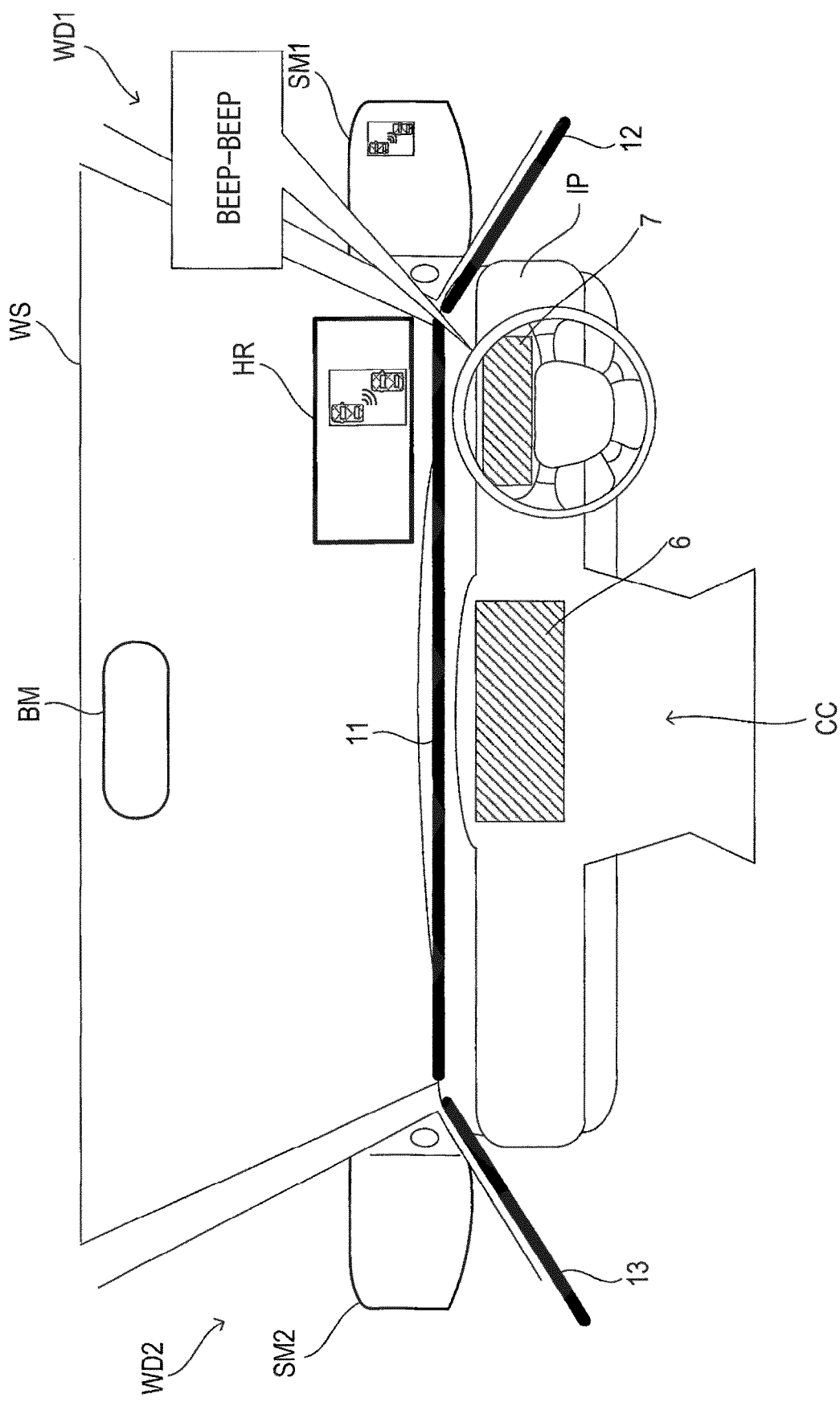
FIG. 9 is a diagram illustrating a second concrete example of information presentation.

Now, it is assumed that the host vehicle MC is attempting to make a lane change in a situation where the following vehicle BC has begun to pass the host vehicle MC. An arrow AL12 indicates that the following vehicle BC has begun to pass the host vehicle MC. An arrow AL13 indicates that the host vehicle MC is attempting to make a lane change. Further, the following vehicle BC is excluded from a watch range WR6 to indicate that the following vehicle BC is not visually recognized by the driver of the host vehicle MC. In this case, as depicted in FIG. 9, the right rear approach image appears in the HUD display region HR and on the mirror surface of the right side mirror SM1, the speaker 14 outputs the warning sound, and the vibrator 15 vibrates.

The information presentation apparatus 1 configured as described above is mounted in a vehicle, and includes the radar apparatus 2, the DSM 3, and the control unit 16.

The radar apparatus 2 detects an out-of-vehicle risk object (e.g., a vehicle or a pedestrian) that exists around the host vehicle and may pose a risk to the host vehicle. The DSM 3 detects the gaze direction of the driver of the host vehicle.

The control unit 16 determines, based on the result of detection by the radar apparatus 2 and the result of detection by the DSM 3, whether the out-of-vehicle risk object is recognized by the driver.

The control unit 16 presents out-of-vehicle risk information regarding the out-of-vehicle risk object to the driver by using the HUD 5, the LED indicators 8, 9, 10, the line LEDs 11, 12, 13, the speaker 14, and the vibrator 15. Further, the control unit 16 changes a presentation mode for presenting the out-of-vehicle risk information to the driver depending on whether the out-of-vehicle risk object is recognized by the driver.

More specifically, when the out-of-vehicle risk object is recognized by the driver, the control unit 16 causes, for example, the display device disposed near in the risk direction to present the out-of-vehicle risk information. Presenting the out-of-vehicle risk information in the above manner is supplementarily performed.

On the contrary, when the out-of-vehicle risk object is not recognized by the driver, the control unit 16 performs, for example, the following four presentations. The first presentation is performed by causing the speaker 14 to output the warning sound. The second presentation is performed by causing the vibrator 15 to generate vibration. The third presentation is performed by causing the display device disposed near in the gaze direction of the driver to display information indicating the risk direction. The fourth presentation is performed by causing the display device disposed near in the risk direction to display an instruction for attracting a driver's attention. The out-of-vehicle risk information is presented in the above manner to enable the driver to recognize the direction in which the out-of-vehicle risk object exists.

As described above, the information presentation apparatus 1 changes the presentation mode for presenting the out-of-vehicle risk information depending on whether the out-of-vehicle risk object is recognized by the driver. Therefore, the information presentation apparatus 1 is able to present the out-of-vehicle risk information in a highlighted manner when the out-of-vehicle risk object is not recognized by the driver, and present the out-of-vehicle risk information in an unhighlighted manner when the out-of-vehicle risk object is recognized by the driver. That is to say, the information presentation apparatus is able to present the out-of-vehicle risk information in such a manner as to enable the driver to recognize the out-of-vehicle risk object when the out-of-vehicle risk object is not recognized by the driver, and present the out-of-vehicle risk information in such a manner as to prevent the driver from feeling annoyed when the out-of-vehicle risk object is recognized by the driver.

Consequently, the information presentation apparatus 1 is able to present the out-of-vehicle risk information while preventing the driver from feeling annoyed without impairing a function for enabling the driver to recognize the out-of-vehicle risk object.

Further, the control unit 16 causes a display device disposed nearest in the risk direction to present the out-of-vehicle risk information when the out-of-vehicle risk object is recognized by the driver, and causes at least a display device disposed in a direction recognizable by the driver to present the out-of-vehicle risk information when the out-of-vehicle risk object is not recognized by the driver. Therefore, in the case where the out-of-vehicle risk object is recognized by the driver, the information presentation apparatus 1 is able to reduce the frequency at which the out-of-vehicle risk information is presented in the gaze direction of the driver, and thus inhibit a situation where the driver feels annoyed. Further, in the case where the out-of-vehicle risk object is not recognized by the driver, the information presentation apparatus 1 is able to make it easy for the driver to recognize the existence of the out-of-vehicle risk object.

Furthermore, based on the risk direction and on the gaze direction of the driver, the control unit 16 determines a presentation position at which the out-of-vehicle risk information is to be presented and the presentation mode for presenting the out-of-vehicle risk information, and then presents the out-of-vehicle risk information at the determined presentation position and in the determined presentation mode. For example, in a case where the risk direction and the gaze direction of the driver are both front forward, the control unit 16 presents the out-of-vehicle risk information by using the HUD 5. Meanwhile, in a case where the risk direction is right rear sideward and the gaze direction of the driver is front forward, the control unit 16 presents the out-of-vehicle risk information by using the LED indicator 8, the speaker 14, the vibrator 15, and the HUD 5. As described above, the control unit 16 presents the out-of-vehicle risk information by changing the presentation position and the presentation mode in accordance with the risk direction and the gaze direction of the driver.

Moreover, in the case where the out-of-vehicle risk object is not recognized by the driver, the control unit 16 presents guidance information for directing the gaze direction of the driver to a direction in which the out-of-vehicle risk object exists. For example, when the risk direction is right front sideward and the gaze direction of the driver is left rear sideward, the control unit 16 illuminates the line LED 13 in such a manner that the resulting light moves from the rear end of the line LED 13 to the front end, and additionally illuminates the line LED 11 in such a manner that the resulting light moves from the left end of the line LED 11 to the right end. This illumination provides a display in which the light moves from the gaze direction of the driver to a direction in which the out-of-vehicle risk object exists. As a result, the information presentation apparatus 1 is able to make it easy for the driver to recognize the direction in which the out-of-vehicle risk object exists.

Additionally, in a case where the status of the driver is changed from a non-recognition state where the out-of-vehicle risk object is not recognized by the driver to a recognition state where the out-of-vehicle risk object is recognized by the driver, the control unit 16 switches from a presentation mode in which the out-of-vehicle risk information is presented in such a manner as to enable the driver to recognize the direction in which the out-of-vehicle risk object exists to a presentation mode in which the out-of-vehicle risk information is presented in a supplementary manner. For example, in a state where the out-of-vehicle risk object is not recognized by the driver, the control unit 16 executes the sixth presentation instruction, and when the status of the driver is changed to the recognition state where the out-of-vehicle risk object is recognized by the driver, the control unit 16 executes the fifth presentation instruction. As a result, the information presentation apparatus 1 is able to inhibit a situation where the out-of-vehicle risk information is presented for recognition of the out-of-vehicle risk object although the out-of-vehicle risk object is recognized by the driver. This enables the information presentation apparatus 1 to further inhibit a situation where the driver feels annoyed.

In addition, in a case where the status of the driver is changed from a viewing state where the driver is viewing the out-of-vehicle risk object to a non-viewing state where the driver is not viewing the out-of-vehicle risk object, the driver predicts a position where the out-of-vehicle risk object will be in several seconds later. Therefore, if it is determined based on an instantaneous gaze direction that the out-of-vehicle risk object is not recognized by the driver, a mismatch would occur between the feeling of the driver and the result of determination on the recognition of the out-of-vehicle risk object. As a result, the driver may feel annoyed by information presentation by the information presentation apparatus 1.

In view of the above, if the behavior of the out-of-vehicle risk object is changed after a change in the status of the driver from the state where the driver is viewing the out-of-vehicle risk object to the state where the driver is not viewing the out-of-vehicle risk object, the control unit 16 determines that the out-of-vehicle risk object is not recognized by the driver. This enables the information presentation apparatus 1 to avoid a situation where it is determined that the out-of-vehicle risk object is not recognized by the driver although the out-of-vehicle risk object is actually recognized by the driver in the state where the driver is not viewing the out-of-vehicle risk object. That is to say, the information presentation apparatus 1 is able to inhibit a situation where a mismatch occurs between the feeling of the driver and the result of determination on the recognition of the out-of-vehicle risk object. As a result, the information presentation apparatus 1 is able to further inhibit a situation where the driver feels annoyed by information presentation by the information presentation apparatus 1.

In the embodiment described above, the radar apparatus 2 corresponds to an out-of-vehicle risk detection section, the DSM 3 corresponds to a gaze detection section, the processing performed in steps S410 to S480 corresponds to the processing performed in a recognition determination section and in a recognition determination step, and the processing performed in steps S10 to S110 and S210 to S290 corresponds to the processing performed in an information presentation section and in an information presentation step.

Further, the display device disposed near in the risk direction corresponds to a first presentation device, and the display device disposed near in the gaze direction of the driver corresponds to a second presentation device.

Second Embodiment

A second embodiment of the present disclosure will now be described with reference to the accompanying drawings. The second embodiment will be described mainly by explaining about portions different from the first embodiment. Components corresponding to those of the first embodiment are designated by the same reference numerals as the corresponding components of the first embodiment.

The information presentation apparatus 1 according to the second embodiment differs from the information presentation apparatus 1 according to the first embodiment in the recognition determination process.

Figure 19:
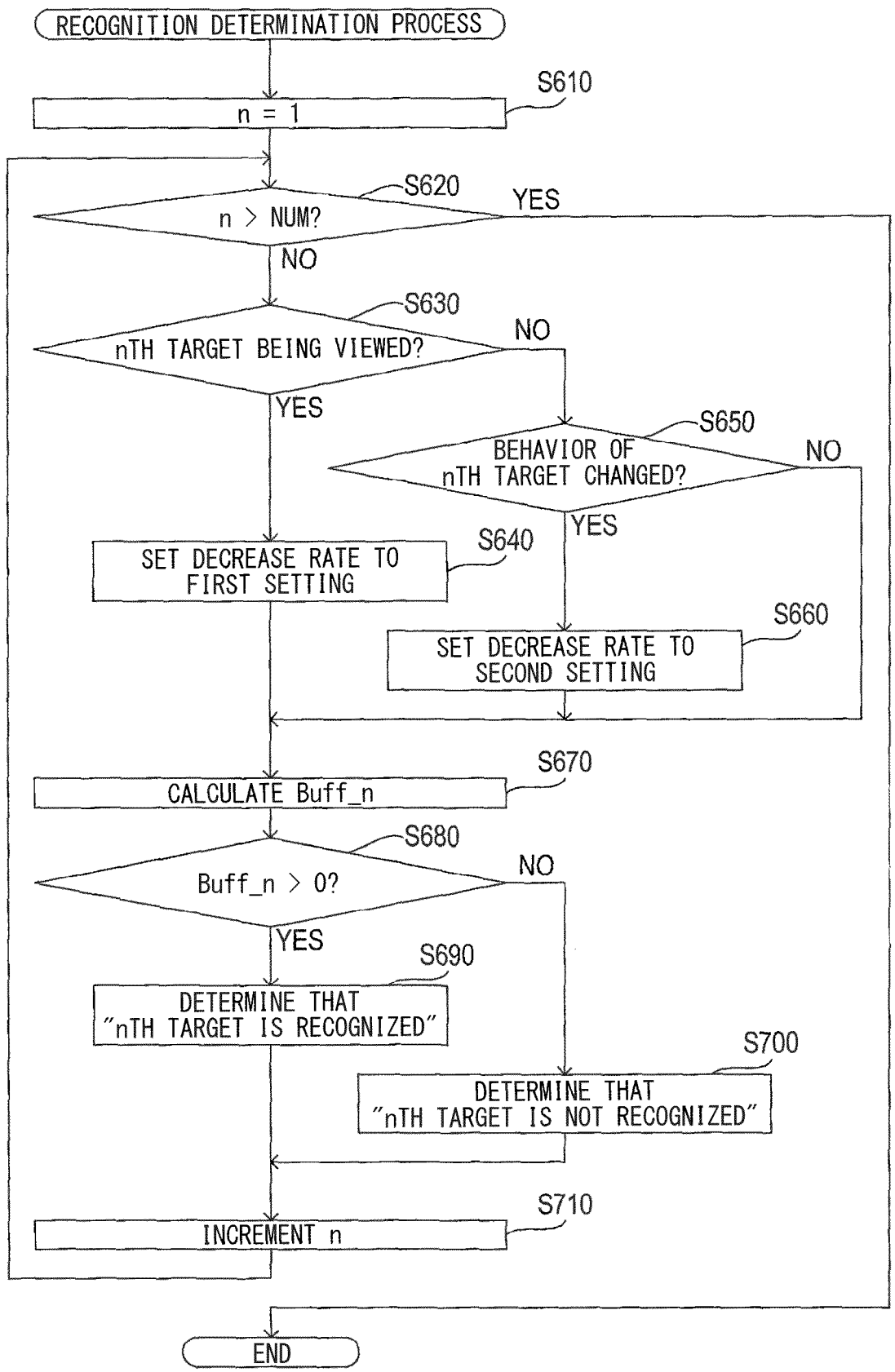
FIG. 19 is a flowchart illustrating the recognition determination process according to a second embodiment.

When the recognition determination process according to the second embodiment starts, the CPU 21 first performs step S610 as depicted in FIG. 19. In step S610, the CPU 21 sets the target indicator value n stored in the RAM 23 to 1. Next, in step S620, the CPU 21 determines whether the target indicator value n is greater than the target count NUM, which indicates the total number of targets currently detected by the radar apparatus 2. If, in step S620, the target indicator value n is greater than the target count NUM, the CPU 21 terminates the recognition determination process.

Meanwhile, if the target indicator value n is equal to or smaller than the target count NUM, the CPU 21 proceeds to step S630. In step S630, based on the result of detection by the DSM 3, the CPU 21 determines whether the driver is viewing the $n^{th}$ target. If, in step S630, the driver is viewing the $n^{th}$ target, the CPU 21 proceeds to step S640. In step S640, the CPU 21 sets a later-described decrease rate to a predetermined first setting (1 [buf/s] in the present embodiment), and then proceeds to step S670.

Meanwhile, if the driver is not viewing the $n^{th}$ target, the CPU 21 proceeds to step S650. In step S650, the CPU 21 determines whether the behavior of the $n^{th}$ target is changed while the driver is not viewing the $n^{th}$ target, as is the case with step S460. If, in step S650, the behavior of the $n^{th}$ target is not changed, the CPU 21 proceeds to step S670. Meanwhile, if the behavior of the $n^{th}$ target is changed, the CPU 21 proceeds to step S660. In step S660, the CPU 21 sets the decrease rate to a second setting (2 [buf/s] in the present embodiment). The second setting is greater than the first setting. Upon completion of step S660, the CPU 21 proceeds to step S670.

In step S670, the CPU 21 calculates the value of the $n^{th}$ attention buffer Buff_n (hereinafter referred to as the $n^{th}$ buffer Buff_n), which is stored in the RAM 23.

Figure 20:
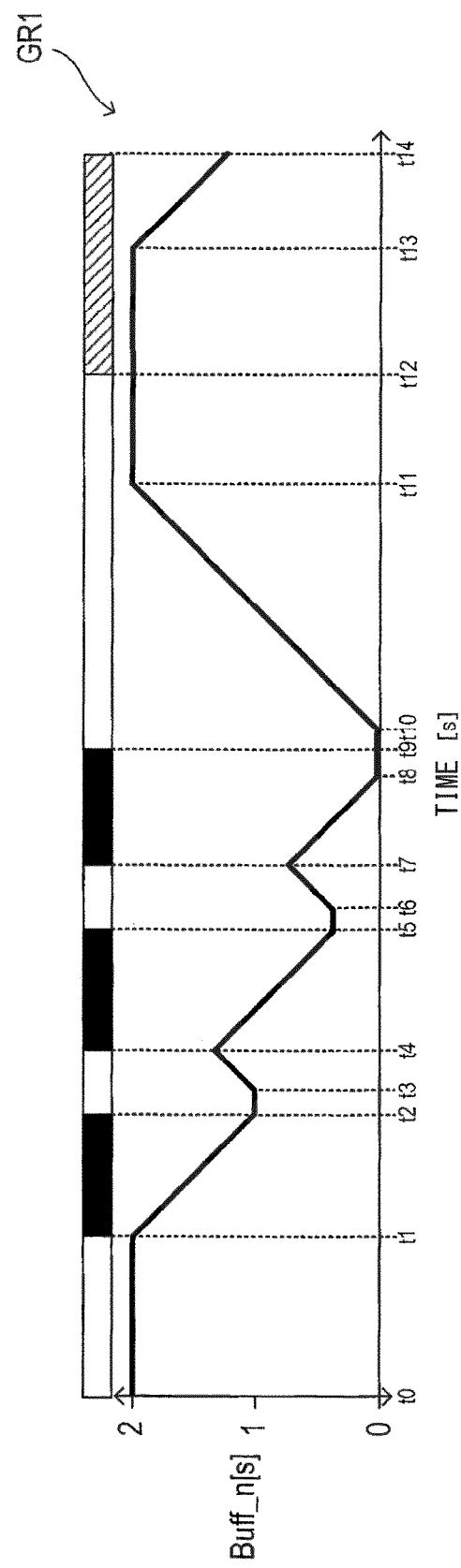
FIG. 20 is a graph illustrating changes in the $n^{th}$ buffer.

A method of calculating the value of the $n^{th}$ buffer Buff_n will now be described with reference to the graph GR1 in FIG. 20. As depicted in FIG. 20, the horizontal axis of the graph GR1 represents time, and the vertical axis of the graph GR1 indicates the value of the $n^{th}$ buffer Buff_n.

The graph GR1 indicates that the $n^{th}$ target is visually recognized by the driver during a period between time t0 and time t1, a period between time t2 and time t4, a period between time t5 and time t7, and a period between time t9 and time t12. Further, the graph GR1 indicates that the $n^{th}$ target is not visually recognized by the driver during a period between time t1 and time t2, a period between time t4 and time t5, and a period between time t7 and time t9. Moreover, a speedometer or a mirror is visually recognized by the driver during a period between time t12 and time 14.

First of all, it is assumed that the value of the $n^{th}$ buffer Buff_n=2.0 [s] at time t0. Then, during the period between time t0 and time t1, the $n^{th}$ target is visually recognized by the driver, and the upper limit value of the $n^{th}$ buffer Buff_n is 2.0 [s]. Therefore, during the period between time t0 and time t1 the value of the $n^{th}$ buffer Buff_n=2.0.

Subsequently, during the period between time t1 and time t2, the $n^{th}$ target is not visually recognized by the driver. Therefore, the value of the $n^{th}$ buffer Buff_n decreases at a preset decrease rate (1 [buf/s] in the present embodiment).

When the $n^{th}$ target is again visually recognized by the driver at time t2, the value of the $n^{th}$ buffer Buff_n stops decreasing. Then, for a preset delay time (0.1 s in the present embodiment), the $n^{th}$ buffer Buff_n retains the value prevailing at time t2. During the period between time t2 and time t4, the $n^{th}$ target is visually recognized by the driver. Therefore, when the preset delay time elapses at time t3, the value of the $n^{th}$ buffer Buff_n increases at a preset increase rate (1 [buf/s] in the present embodiment).

At time t4, the $n^{th}$ target is again not recognized by the driver, and the resulting state where the $n^{th}$ target is not visually recognized by the driver continues until time t5. Therefore, during the period between time t4 and time t5, the value of the $n^{th}$ buffer Buff_n decreases at the preset decrease rate.

When the $n^{th}$ target is again visually recognized by the driver at time t5, the value of the $n^{th}$ buffer Buff_n stops decreasing. Then, for the preset delay time, the $n^{th}$ buffer Buff_n retains the value prevailing at time t5. During the period between time t5 and time t7, the $n^{th}$ target is visually recognized by the driver. Therefore, when the preset delay time elapses at time t6, the value of the $n^{th}$ buffer Buff_n increases at the preset increase rate.

At time t7, the $n^{th}$ target is again not recognized by the driver, and the resulting state where the $n^{th}$ target is not visually recognized by the driver continues until time t9. Therefore, the value of the $n^{th}$ buffer Buff_n decreases at the preset decrease rate. Subsequently, when the value of the $n^{th}$ buffer Buff_n decreases to 0 [s] at time t8, the $n^{th}$ buffer Buffer_n retains the value 0 [s] until time t9.

When the $n^{th}$ target is again visually recognized by the driver at time t9, the $n^{th}$ buffer Buff_n retains the value prevailing at time t9 for the preset delay time. During the period between time t9 and time t12, the $n^{th}$ target is visually recognized by the driver. Therefore, when the preset delay time elapses at time t10, the value of the $n^{th}$ buffer Buff_n increases at the preset increase rate.

Subsequently, when the value of the $n^{th}$ buffer Buff_n increases to 2.0 [s] at time t11, the $n^{th}$ buffer Buffer_n retains the value 2.0 [s] until time t12.

When the driver begins to visually recognize the speedometer or a mirror at time t12, the $n^{th}$ buffer Buff_n retains the value prevailing at time t12 for a preset standby time (1.0 s in the present embodiment). During the period between time t12 and time t14, the speedometer or the mirror is visually recognized by the driver. Therefore, when the preset standby time elapses at time t13, the value of the $n^{th}$ buffer Buff_n decreases at the preset decrease rate.

As described above, the CPU 21 calculates the value of the $n^{th}$ buffer Buff_n by increasing or decreasing the value of the $n^{th}$ buffer Buff_n depending on whether the $n^{th}$ target is visually recognized by the driver and whether the speedometer or a mirror is visually recognized by the driver.

When the processing in step S670 terminates, the CPU 21 proceeds to step S680 as depicted in FIG. 19. In step S680, the CPU 21 determines whether the value of the $n^{th}$ buffer Buff_n is greater than 0. If, in step S680, the value of the $n^{th}$ buffer Buff_n is greater than 0, the CPU 21 proceeds to step S690. In step S690, the CPU 21 determines that "the $n^{th}$ target is recognized by the driver," and then proceeds to step S710. Meanwhile, if the value of the $n^{th}$ buffer Buff_n is equal to or smaller than 0, the CPU 21 proceeds to step S700. In step S700, the CPU 21 determines that "the $n^{th}$ target is not recognized by the driver," and then proceeds to step S710.

In step S710, the CPU 21 increments the target indicator value n, and then returns to step S620.

As described above, the information presentation apparatus 1 is configured such that the control unit 16 calculates the value of the $n^{th}$ buffer Buff_n by increasing the value of the $n^{th}$ buffer Buff_n at the preset increase rate in the case where the driver is viewing the out-of-vehicle risk object and by decreasing the value of the $n^{th}$ buffer Buff_n at the preset decrease rate in the case where the driver is not viewing the out-of-vehicle risk object. Then, based on the calculated value of the $n^{th}$ buffer Buff_n, the control unit 16 determines whether the out-of-vehicle risk object is recognized by the driver.

Further, the control unit 16 increases the decrease rate in a case where the behavior of the out-of-vehicle risk object is changed after a change in the status of the driver from the state where the driver is viewing the out-of-vehicle risk object to the state where the driver is not viewing the out-of-vehicle risk object.

Consequently, in the case where the behavior of the out-of-vehicle risk object is changed after a change in the status of the driver from the viewing state where the driver is viewing the out-of-vehicle risk object to the non-viewing state where the driver is not viewing the out-of-vehicle risk object, the information presentation apparatus 1 is able to determine that the out-of-vehicle risk object is not recognized by the driver.

As a result, the information presentation apparatus 1 is able to avoid a situation where the out-of-vehicle risk object is determined to be not recognized by the driver although the out-of-vehicle risk object is recognized by the driver in the state where the driver is not viewing the out-of-vehicle risk object. That is to say, the information presentation apparatus 1 is able to inhibit a situation where a mismatch occurs between the feeling of the driver and the result of determination on the recognition of the out-of-vehicle risk object. As a result, the information presentation apparatus 1 is able to further inhibit a situation where the driver feels annoyed by information presentation by the information presentation apparatus 1.

In the above-described embodiments, the processing performed in steps S610 to S710 corresponds to the processing performed in the recognition determination section and in the recognition determination step.

While the present disclosure has been described in terms of preferred foregoing embodiments, the present disclosure is not limited to such embodiments. It should be understood by those skilled in the art that various modifications can be made without departing from the spirit and scope of the present disclosure.

First Modification

For example, the foregoing embodiments are configured such that the HUD 5, the LED indicators 8, 9, 10, the line LEDs 11, 12, 13, the speaker 14, and the vibrator 15 are used as the auxiliary devices. However, in a case where the gaze direction of the driver is toward the CID 6 or the MID 7, the CID 6 and the MID 7 may be used as the auxiliary devices. Further, in a case where the gaze direction of the driver is toward a smartphone of the driver, the out-of-vehicle risk information may be presented to the smartphone of the driver. Furthermore, in a case where the gaze direction of the driver is toward a passenger, at least one of sound and vibration may be generated.

Second Modification

Figure 11:
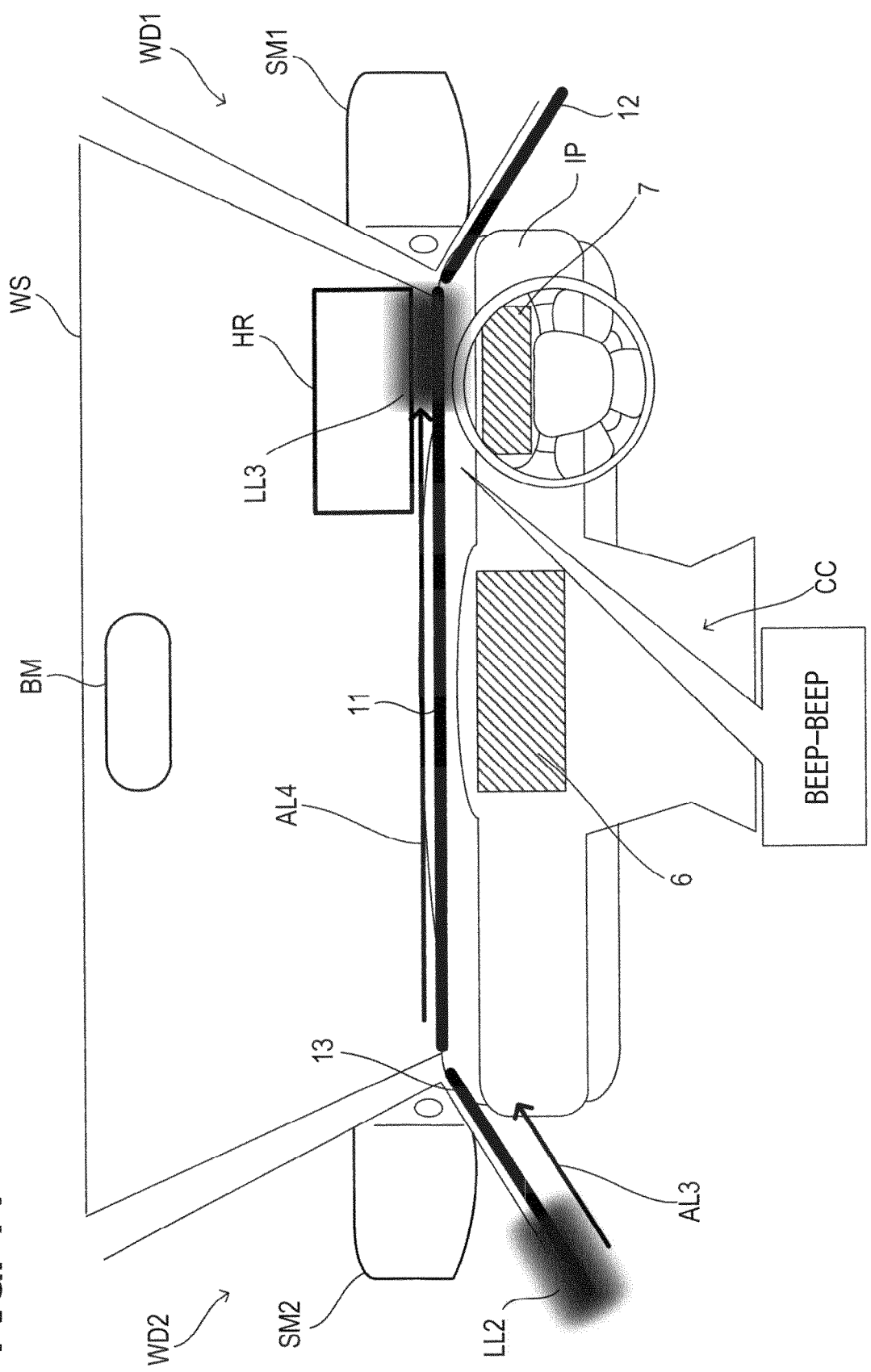
FIG. 11 is a diagram illustrating a fourth concrete example of information presentation.

The foregoing embodiments are configured such that the speaker 14 outputs the warning sound as depicted in FIG. 11 when the risk direction is right front sideward and the gaze direction of the driver is left rear sideward. However, in a case where the speaker 14 includes stereo speakers, the speaker disposed to the right of the driver may output the warning sound. This makes it easy for the driver to recognize that the risk direction is rightward.

Third Modification

The foregoing embodiments are configured such that the presentation mode changes so as to present the out-of-vehicle risk information in a supplementary manner in a case where the status of the driver is changed from a state where the out-of-vehicle risk object is not recognized by the driver to the state where the out-of-vehicle risk object is recognized by the driver. However, if the state where the out-of-vehicle risk object is not recognized by the driver continues, the out-of-vehicle risk information may be presented in a highlighted manner. In this case, for example, the warning sound may be emitted again without changing the presented out-of-vehicle risk information.

Fourth Modification

The foregoing embodiments are configured such that the reference devices and the auxiliary devices are combined as depicted in FIG. 7. However, the present disclosure is not limited to such configuration. Alternatively, some devices may be used in different combinations, removed, or added.

The control unit 16 and a method adopted by the control unit 16 that are described in the present disclosure may be implemented by a dedicated computer that is provided by configuring a memory and a processor programmed to execute one or more functions embodied by a computer program. As an alternative, the control unit 16 and the method adopted by the control unit 16 that are described in the present disclosure may be implemented by a dedicated computer that is provided by configuring a processor through the use of one or more dedicated hardware logic circuits. As another alternative, the control unit 16 and the method adopted by the control unit 16 that are described in the present disclosure may be implemented by one or more dedicated computers that are configured by combining a processor configured through the use of one or more hardware logic circuits with a memory and a processor programmed to execute one or more functions. Further, the computer program may be stored on a computer-readable, non-transitory, tangible recording medium as a set of computer-executable instructions. The method of implementing various functions included in the control unit 16 does not necessarily include software. All of the functions included in the control unit 16 may be implemented by using one or more pieces of hardware.

A plurality of functions possessed by one component in the foregoing embodiments may be implemented by a plurality of components, and a function possessed by one component may be implemented by a plurality of components. Further, a plurality of functions possessed by a plurality of components may be implemented by one component, and one function implemented by a plurality of components may be implemented by one component. Furthermore, some of the components in the foregoing embodiments may be omitted. Moreover, at least some of the components in one of the foregoing embodiments may be added to the other foregoing embodiment or replaced by the components in the other foregoing embodiment.

The present disclosure may be not only implemented by the above-described information apparatus 1, but also implemented in various other forms such as a system including the information presentation apparatus 1, a program for causing a computer to function as the information presentation apparatus 1, a semiconductor memory or other non-transitory, tangible recording medium in which the program is recorded, and an information presentation method.

The invention claimed is:

1. An information presentation apparatus that is mounted in a vehicle, the information presentation apparatus comprising at least one processor programmed to:
   detect an out-of-vehicle risk object that exists around the vehicle and potentially poses a risk to the vehicle;
   detect a gaze direction of a driver of the vehicle;
   determine whether the out-of-vehicle risk object is recognized by the driver based on a detection result of the out-of-vehicle risk object of the gaze direction; and
   present, to the driver, out-of-vehicle risk information regarding the out-of-vehicle risk object in a presentation mode, wherein
   the at least one processor is further programmed to:
      change the presentation mode depending on whether the out-of-vehicle risk object is recognized by the driver based on a determination result of the out-of-vehicle object;
      calculate a value of an attention buffer by increasing the value of the attention buffer at a predetermined increase rate when the driver is viewing the out-of-vehicle risk object and by decreasing the value of the attention buffer at a predetermined decrease rate when the driver is not viewing the out-of-vehicle risk object; and
      determine whether the out-of-vehicle risk object is recognized by the driver based on the calculated value of the attention buffer; and
      increase the decrease rate when the out-of-vehicle risk object changes its behavior after the driver changed from a viewing state where the driver was viewing the out-of-vehicle risk object to a non-viewing state where the driver was not viewing the out-of-vehicle risk object.

2. The information presentation apparatus according to claim 1, wherein
   the at least one processor is further programmed to:
      supplementarily present the out-of-vehicle risk information when the out-of-vehicle risk object is recognized by the driver; and
      present the out-of-vehicle risk information such that the driver is able to visually recognize an object in a direction toward the out-of-vehicle risk object when the out-of-vehicle risk object is not recognized by the driver.

3. The information presentation apparatus according to claim 1, wherein
the at least one processor is programmed to control:
a first presentation device to present the out-of-vehicle risk information when the out-of-vehicle risk object is recognized by the driver, the first presentation device being located closest to the out-of-vehicle risk object in the direction toward the out-of-vehicle risk object; and
a second presentation device to present the out-of-vehicle risk information when the out-of-vehicle risk object is not recognized by the driver, the second presentation device being located at least in a direction in which the driver is recognizable.

4. The information presentation apparatus according to claim 1, wherein
the at least one processor is further programed to:
determine the presentation mode and a presentation position at which the out-of-vehicle risk information is to be presented based on the gaze direction of the driver and the direction in which the out-of-vehicle risk object exists; and
present the out-of-vehicle risk information in the determined presentation mode and at the determined presentation position.

5. The information presentation apparatus according to claim 1, wherein
the at least one processor is programmed to present guidance information, as the out-of-vehicle risk information, that directs the gaze direction of the driver toward the out-of-vehicle risk object when the out-of-vehicle risk object is not recognized by the driver.

6. The information presentation apparatus according to claim 5, wherein
the guidance information is presented by moving light from the gaze direction of the driver toward the out-of-vehicle risk object.

7. The information presentation apparatus according to claim 2, wherein
when the driver changes from a non-recognition state where the out-of-vehicle risk object is not recognized by the driver to a recognition state where the out-of-vehicle risk object is recognized by the driver, the at least one processor is programmed to changes the presentation mode from a mode in which the out-of-vehicle risk information is presented such that the driver is able to recognize an object in the direction in which the out-of-vehicle risk object exists to a mode in which the out-of-vehicle risk information is supplementarily presented.

8. A method for an information presentation apparatus that is mounted in a vehicle, the method comprising:
detecting an out-of-vehicle risk object that exists around the vehicle and potentially poses a risk to the vehicle;
detecting a gaze direction of a driver of the vehicle;
determining whether the out-of-vehicle risk object is recognized by the driver based on a detection result of the out-of-vehicle risk object and a detection result of the gaze direction; and
presenting, to the driver, out-of-vehicle risk information regarding the out-of-vehicle risk object in a presentation mode, wherein
the method further comprises:
changing the presentation mode depending on whether the out-of-vehicle risk object is recognized by the driver based on a determination result of the out-of-vehicle object;
calculating a value of an attention buffer by increasing the value of the attention buffer at a predetermined increase rate when the driver is viewing the out-of-vehicle risk object and by decreasing the value of the attention buffer at a predetermined decrease rate when the driver is not viewing the out-of-vehicle risk object;
determining whether the out-of-vehicle risk object is recognized by the driver based on the calculated value of the attention buffer; and
increasing the decrease rate when the out-of-vehicle risk object changes its behavior after the driver changed from a viewing state where the driver was viewing the out-of-vehicle risk object to a non-viewing state where the driver was not viewing the out-of-vehicle risk object.

9. A non-transitory, computer readable, tangible storage medium storing a program for at least one processor of an information presentation apparatus that is mounted in a vehicle, the program, when executed by the at least one processor, causing the at least one processor to perform:
detecting an out-of-vehicle risk object that exists around the vehicle and potentially poses a risk to the vehicle;
detecting a gaze direction of a driver of the vehicle;
determining whether the out-of-vehicle risk object is recognized by the driver based on a detection result of the out-of-vehicle risk object and a detection result of the gaze direction; and
presenting, to the driver, out-of-vehicle risk information regarding the out-of-vehicle risk object in a presentation mode, wherein
the program further causes the at least one processor to perform:
changing the presentation mode depending on whether the out-of-vehicle risk object is recognized by the driver based on a determination result of the out-of-vehicle object;
calculating a value of an attention buffer by increasing the value of the attention buffer at a predetermined increase rate when the driver is viewing the out-of-vehicle risk object and by decreasing the value of the attention buffer at a predetermined decrease rate when the driver is not viewing the out-of-vehicle risk object;
determining whether the out-of-vehicle risk object is recognized by the driver based on the calculated value of the attention buffer; and
increasing the decrease rate when the out-of-vehicle risk object changes its behavior after the driver changed from a viewing state where the driver was viewing the out-of-vehicle risk object to a non-viewing state where the driver was not viewing the out-of-vehicle risk object.

* * * * *